United States Patent
Xiong

(10) Patent No.: US 12,192,928 B2
(45) Date of Patent: ***Jan. 7, 2025

(54) TIME SYNCHRONIZATION METHOD AND APPARATUS, COMPUTER-READABLE MEDIUM, AND ELECTRONIC DEVICE

(71) Applicant: Tencent Technology (Shenzhen) Company Limited, Shenzhen (CN)

(72) Inventor: Chunshan Xiong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 425 days.

This patent is subject to a terminal disclaimer.

(21) Appl. No.: 17/697,615

(22) Filed: Mar. 17, 2022

(65) Prior Publication Data

US 2022/0210755 A1    Jun. 30, 2022

Related U.S. Application Data

(63) Continuation of application No. PCT/CN2021/075479, filed on Feb. 5, 2021.

(30) Foreign Application Priority Data

Mar. 23, 2020   (CN) .......................... 202010210081.3

(51) Int. Cl.
*H04W 56/00* (2009.01)
(52) U.S. Cl.
CPC ................................. *H04W 56/001* (2013.01)
(58) Field of Classification Search
CPC ............... H04W 56/001; H04W 40/02; H04W 56/002; H04W 4/14; H04J 3/12;
(Continued)

(56) References Cited

U.S. PATENT DOCUMENTS

| 2019/0353843 | A1 | 11/2019 | Liu et al. |
| 2020/0084663 | A1* | 3/2020 | Park ........................ H04W 8/08 |
| 2020/0267785 | A1* | 8/2020 | Talebi Fard ............ H04L 45/04 |

FOREIGN PATENT DOCUMENTS

| CN | 110463231 A | 11/2019 |
| CN | 110611924 A | 12/2019 |

(Continued)

OTHER PUBLICATIONS

Extended European Search Report for Application No. 21774527.2 dated Nov. 8, 2022 (11 pages).

(Continued)

*Primary Examiner* — Kwang B Yao
*Assistant Examiner* — Syed M Bokhari
(74) *Attorney, Agent, or Firm* — Crowell & Moring LLP

(57) ABSTRACT

Embodiments of this application provide a time synchronization method and apparatus, a computer-readable medium, and an electronic device. The time synchronization method includes: receiving a triggering delivery service request message transmitted by an application function (AF) entity, the triggering delivery service request message including an identifier of a target user equipment and a time sensitive network (TSN) trigger container, the TSN trigger container being used for indicating a TSN time synchronization trigger condition; and transmitting a submission triggering message to a short message service-service center (SMS-SC), the submission triggering message being used for requesting the SMS-SC to transmit a short message including the TSN trigger container to the target user equipment, to enable the target user equipment to perform a TSN time synchronization operation based on the TSN trigger container.

17 Claims, 12 Drawing Sheets

(58) Field of Classification Search
CPC ...... H04J 3/0667; H04J 3/0638; H04J 3/0658; H04L 7/0004; H04L 47/28
USPC .......................................................... 370/350
See application file for complete search history.

(56) References Cited

FOREIGN PATENT DOCUMENTS

| | | |
|---|---|---|
| CN | 110831249 A | 2/2020 |
| CN | 111490842 A | 8/2020 |
| CN | 111525973 A | 8/2020 |

OTHER PUBLICATIONS

Tencent, "AF Requested TSN Synchronization Activation and Deactivation", 3GPP Draft; S2-2001662, Jan. 20, 2020 (4 pages).
3GPP TS 23.502 V16.3.0, Procedures for the 5G System (5GS), Dec. 22, 2019, (3 pages).
Huawei et al., "Discussion on System Enhancement for TSN Logical Bridge Management", 3GPP TSG-SA WG2 Meeting #130 S2-1900590, Jan. 21, 2019 (4 pages).
International Search Report and Written Opinion for International Application No. PCT/CN2021/075479 mailed Apr. 25, 2021 including translation of International Search Report.

\* cited by examiner

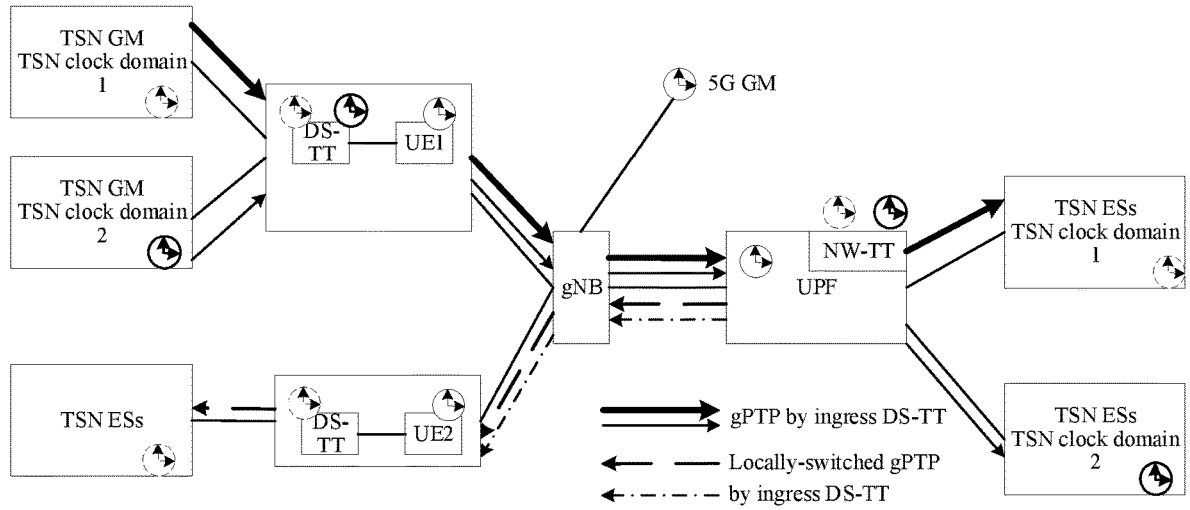

FIG. 3

| Receive a triggering delivery service request message transmitted by an application function (AF) entity, the triggering delivery service request message including an identifier of a target user equipment and a time sensitive network (TSN) trigger container, the TSN trigger container being used for indicating a TSN time synchronization trigger condition | S410 |

| Transmit a submission triggering message to a short message service-service center (SMS-SC), the submission triggering message being used for requesting the SMS-SC to transmit a short message including the TSN trigger container to the target user equipment, to enable the target user equipment to perform a TSN time synchronization operation based on the TSN trigger container | S420 |

FIG. 4

TIME SYNCHRONIZATION METHOD AND APPARATUS, COMPUTER-READABLE MEDIUM, AND ELECTRONIC DEVICE

RELATED APPLICATION

This application is a continuation of International Patent Application No. PCT/CN2021/075479, filed Feb. 5, 2021, which claims priority to Chinese Patent Application No. 202010210081.3, entitled "TIME SYNCHRONIZATION METHOD AND APPARATUS, COMPUTER-READABLE MEDIUM, AND ELECTRONIC DEVICE" and filed with the China National Intellectual Property Administration on Mar. 23, 2020. The contents of International Patent Application No. PCT/CN2021/075479 and Chinese Patent Application No. 202010210081.3 are each incorporated herein by reference in their entirety.

FIELD OF THE TECHNOLOGY

This application relates to the field of computer and communication technologies, and specifically, to a time synchronization method and apparatus, a computer-readable medium, and an electronic device.

BACKGROUND OF THE DISCLOSURE

In a release 16 (R16) version of the 5th-generation (5G) system, time sensitive communication (TSC) of a time sensitive network (TSN) is introduced, to enable the 5G system to support industrial automation production applications with precise time control.

SUMMARY

Embodiments of this application provide a time synchronization method and apparatus, a computer-readable medium, and an electronic device, to at least implement effective control over a time synchronization operation of a user equipment to some extent.

According to an aspect of the embodiments of this application, a time synchronization method is provided, including: receiving a triggering delivery service request message transmitted by an application function (AF) entity, the triggering delivery service request message including an identifier of a target user equipment and a time sensitive network (TSN) trigger container, the TSN trigger container being used for indicating a TSN time synchronization trigger condition; and transmitting a submission triggering message to a short message service-service center (SMS-SC), the submission triggering message being used for requesting the SMS-SC to transmit a short message including the TSN trigger container to the target user equipment, to enable the target user equipment to perform a TSN time synchronization operation based on the TSN trigger container.

According to an aspect of the embodiments of this application, a time synchronization method is provided, including: receiving a short message transmitted by a short message service-service center (SMS-SC), the short message including a time sensitive network (TSN) trigger container, the TSN trigger container being used for indicating a TSN time synchronization trigger condition; and performing a TSN time synchronization operation based on information included in the TSN trigger container.

According to an aspect of the embodiments of this application, a time synchronization method is provided, including: receiving a submission triggering message, the submission triggering message being used for requesting to transmit a short message including a time sensitive network (TSN) trigger container to a target user equipment, the TSN trigger container being used for indicating a TSN time synchronization trigger condition; and generating the short message, and transmitting the short message to the target user equipment, to enable the target user equipment to perform a TSN time synchronization operation based on the TSN trigger container.

According to an aspect of the embodiments of this application, a time synchronization apparatus is provided, including: a first receiving unit, configured to receive a triggering delivery service request message transmitted by an application function (AF) entity, the triggering delivery service request message including an identifier of a target user equipment and a time sensitive network (TSN) trigger container, the TSN trigger container being used for indicating a TSN time synchronization trigger condition; and a first transmission unit, configured to transmit a submission triggering message to a short message service-service center (SMS-SC), the submission triggering message being used for requesting the SMS-SC to transmit a short message including the TSN trigger container to the target user equipment, to enable the target user equipment to perform a TSN time synchronization operation based on the TSN trigger container.

According to an aspect of the embodiments of this application, a time synchronization apparatus is provided, including: a second receiving unit, configured to receive a short message transmitted by a short message service-service center (SMS-SC), the short message including a time sensitive network (TSN) trigger container, the TSN trigger container being used for indicating a TSN time synchronization trigger condition; and a processing unit, configured to perform a TSN time synchronization operation based on information included in the TSN trigger container.

According to an aspect of the embodiments of this application, a time synchronization apparatus is provided, including: a third receiving unit, configured to receive a submission triggering message, the submission triggering message being used for requesting to transmit a short message including a time sensitive network (TSN) trigger container to a target user equipment, the TSN trigger container being used for indicating a TSN time synchronization trigger condition; and a second transmission unit, configured to generate the short message, and transmit the short message to the target user equipment, to enable the target user equipment to perform a TSN time synchronization operation based on the TSN trigger container.

According to an aspect of the embodiments of this application, a computer-readable medium is provided, storing a computer program, the computer program, when executed by a processor, implementing the time synchronization methods according to the foregoing embodiments.

According to an aspect of the embodiments of this application, an electronic device is provided, including: one or more processors; and a storage apparatus, configured to store one or more programs, the one or more programs, when executed by the one or more processors, causing the one or more processors to implement the time synchronization methods according to the foregoing embodiments.

In the technical solutions provided in some embodiments of this application, an AF entity transmits a triggering delivery service request message to an SMS-SC, and the SMS-SC further transmits a short message including a TSN trigger container to a target user equipment, to control the target user equipment to perform a TSN time synchronization operation based on the TSN trigger container, thereby implementing effective control over time synchronization operations of one user equipment or a group of user equipments.

It is to be understood that, the foregoing general descriptions and the following detailed descriptions are merely for illustration and explanation purposes and are not intended to limit this application.

BRIEF DESCRIPTION OF THE DRAWINGS

Accompanying drawings herein are incorporated into the specification and constitute a part of this specification, show embodiments that conform to this application, and are used for describing a principle of this application together with this specification. Apparently, the accompanying drawings described below are merely some embodiments of this application, and a person of ordinary skill in the art may further obtain other accompanying drawings according to the accompanying drawings without creative efforts. In the accompanying drawings:

FIG. 3 is a schematic diagram of an architecture required by time synchronization in a 5G R17 standard.

FIG. 4 is a flowchart of a time synchronization method according to an embodiment of this application.

DESCRIPTION OF EMBODIMENTS

Figure 1:
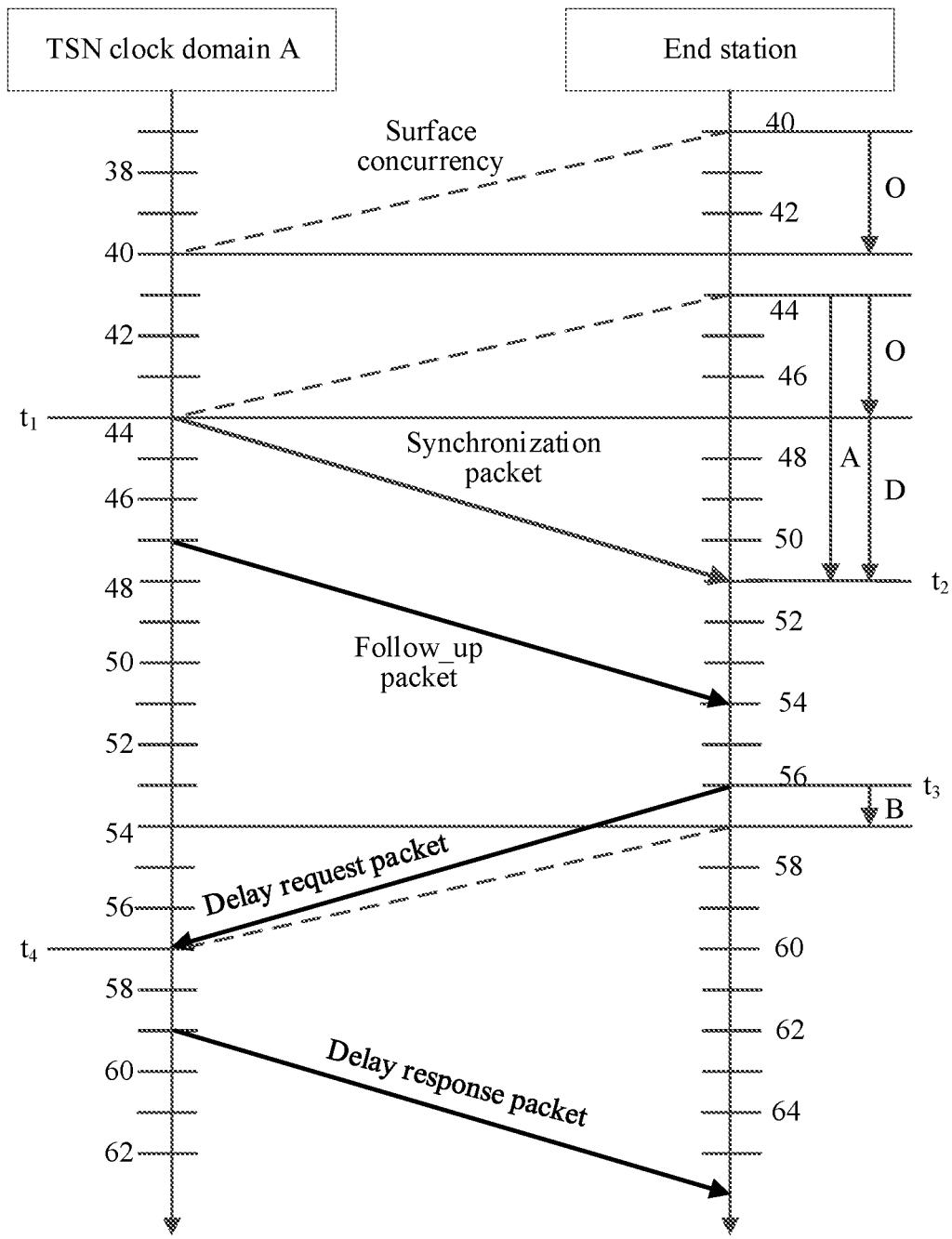
FIG. 1 is a schematic diagram of a time synchronization process.

Exemplary implementations will now be described more thoroughly with reference to the accompanying drawings.

However, the exemplary implementations may be implemented in various forms, and are not to be understood as being limited to the examples described herein. Instead, the implementations are provided to make this application more thorough and complete and fully convey the idea of the exemplary implementations to a person skilled in the art.

In addition, the described features, structures, or characteristics may be combined in one or more embodiments in any appropriate manner. In the following descriptions, a lot of specific details are provided to give a comprehensive understanding of the embodiments of this application. However, a person of ordinary skill in the art is to be aware that, the technical solutions in this application may be implemented without one or more of the particular details, or another method, unit, apparatus, or step may be used. In other cases, well-known methods, apparatuses, implementations, or operations are not shown or described in detail, in order not to obscure the aspects of this application.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses, and/or microcontroller apparatuses.

The flowcharts shown in the accompanying drawings are merely exemplary descriptions, do not need to include all content and operations/steps, and do not need to be performed in the described orders either. For example, some operations/steps may be further divided, while some operations/steps may be combined or partially combined. Therefore, an actual execution order may change according to an actual case.

In the related art, clock offset measurement may be implemented by using messages and algorithms of a precision time protocol (PTP, defined by an institute of electrical and electronics engineers (IEEE) 1588 protocol) and a generalized precision time protocol (gPTP, defined by an IEEE 802.1AS protocol).

In the time synchronization process shown in FIG. 1, a time data recipient (herein an end station (ES) is assumed to be a device connected to a local area network (LAN) or a metropolitan area network (MAN) and play a role of a source and/or a destination of traffic carried on the LAN or the MAN) measures, based on a method defined by an IEEE 1588v2 protocol, a clock offset (hereinafter referred to O for short) and a delay (hereinafter referred to D for short) with a time sensitive network (TSN) clock domain A according to a received data packet.

The clock offset and the delay are implemented through some processes and algorithms, and involve the following formulas:

$$O = \text{Offset} = (t_2 + t_3 - t_1 - t_4)/2;$$

$$t_2 = t_1 + D + O;$$

$$A = t_2 - t_1 = D + O;$$

$$B = t_4 - t_3 = D - O;$$

$$\text{Delay } D = (A+B)/2;$$

$$\text{Offset } O = (A-B)/2; \text{ and}$$

$$t_4 = t_3 - O + D.$$

In the foregoing formulas, A and B are intermediate variables; $t_1$ is a time value of the TSN clock domain A carried in a synchronization packet (Sync) message or a follow-up packet (Follow_up) message; $t_2$ and $t_3$ are time values of a local clock of the ES, where $t_2$ represents a corresponding time value of the local clock when the ES receives the Sync message, and $t_3$ represents a corresponding time value of the local clock when the ES transmits a delay request packet (Delay_Req) message; D represents a transmission delay value of the Sync message transmitted from the TSN clock domain A to the ES; and $t_4$ is a corresponding time value of the TSN clock domain A when the TSN clock domain A receives the Delay_Req message.

After any one of the clock offset between the local clock of the ES and the TSN clock domain A is measured and the delay is measured, the ES may set a time thereof by using any parameter, to implement synchronization between a local time of the ES and a time of a grand master clock of the TSN clock domain A, which is an algorithm of performing time synchronization between the ES and the grand master clock of the TSN clock domain A.

After a period of time, the offset between the time of the ES and the time of the grand master clock of the clock domain A may be increasingly larger, to ensure the precision and stability of the time of the ES, the foregoing measurement process may be repeated periodically, to ensure the offset between the time of the ES and the time of the grand master clock of the clock domain A to be within a specific range. Since there are a plurality of ESs in one clock domain, in event that such bidirectional signaling interaction needs to be performed between each ES and a grand master clock, implementation costs of the grand master clock may be greatly increased, and the stability and precision of the clock may be affected. To simplify this measurement process, the grand master clock may transmit Sync (optionally, Follow_up) messages with multicast addresses as destination addresses periodically rather than performing bidirectional signaling interaction with the ESs, and networks transmitting these messages accurately calculate transmission delays of the Sync (optionally, Follow_up) messages from the grand master clock to the ESs. In this way, the ESs can implement time synchronization with the grand master clock according to the delays provided by the networks and a time value of the grand master clock on the Sync (optionally, Follow_up) messages, and for a specific implementation manner, reference may be made to the IEEE 802.1AS protocol.

Figure 2:
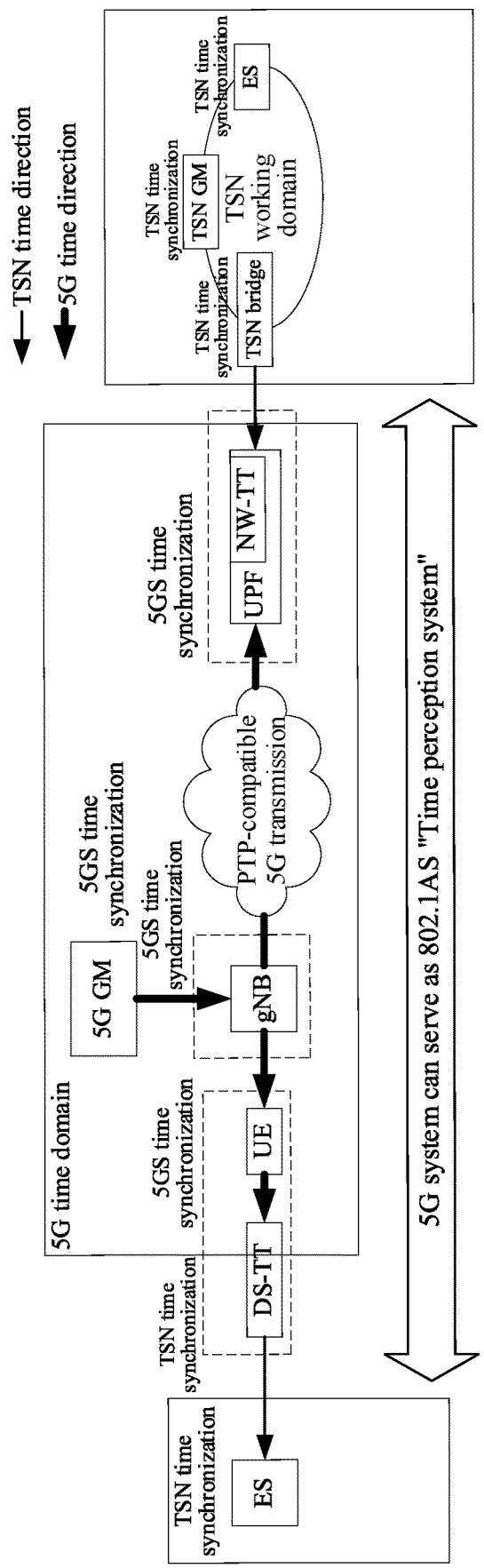
FIG. 2 is a schematic diagram of an architecture supporting time synchronization of an external time domain of a 5G system.

FIG. 2 is a schematic diagram of an architecture supporting time synchronization of an external time domain of a 5G system.

As shown in FIG. 2, the 5G system is integrated into a TSN system as a TSN bridge. The "logic" TSN bridge includes a TSN converter configured to perform user plane interaction between the TSN system and the 5G system. Functions of the TSN converter of the 5G system (5GS) include a device side TSN translator (DS-TT) and a network TSN translator (NW-TT). A user equipment (UE) in the 5G system is connected to one or more ESs in a TSN data network (TSN DN) located outside the 5G system through the DS-TT. A user plane function (UPF) entity is connected to one or more ESs in the TSN DN through the NW-TT.

To implement a TSN synchronization mechanism, the entire end-to-end 5G system may be considered as an IEEE 802.1AS time aware system. As shown in FIG. 2, there are two time synchronization domains which are respectively a 5G time domain and a TSN time domain. The 5G system has an own time system (for example, the Global Positioning System) time, and in FIG. 2, a 5G grand master (5G GM) is used to represent a clock domain of the 5G system (namely, the 5G time domain). Herein, time domain and clock domain are used interchangeably.

In FIG. 2, gNB represents a 5G base station. Devices in the 5G system are all synchronized to the 5G clock domain. The devices in the 5G system include: a UPF entity, a session management function (SMF) entity, a UE, a DS-TT, a NW-TT, a NG radio access network (NG RAN) device, and the like, where an NG interface is an interface between a RAN and a 5G core network.

As shown in FIG. 2, a clock source of an external TSN time domain is located outside the UPF entity. A UE side device ES of the TSN is connected to the UE through the DS-TT to access into a 5G network, and is then connected to an external TSN network through the UPF entity and the NW-TT on the UPF entity, to perform time synchronization with the TSN clock source.

In FIG. 2, a time synchronization message may be transmitted by a TSN GM through downlink (hereinafter referred to as DL for short) data, namely, transmitted by a user plane of the UE. The DL data including the time synchronization message of the TSN GM first reaches the NW-TT/UPF entity, enters the 5G system, then reaches the UE and the DS-TT thereof, and finally reaches the UE side ES.

The TSN GM marks a current time thereof on an originTimestamp domain of the time synchronization message transmitted by the TSN GM, the user plane of the UE marks a receiving time when the DL data is received on the time synchronization message while transmitting the time synchronization message, and updates a value of a CorrectionField domain in the data packet into a sum of the original value of the CorrectionField domain and a transmission delay value between the NW-TT and an Ethernet bridge port transmitting the message to the NW-TT, where the transmission delay between the NW-TT and the port may be obtained according to the method shown in FIG. 1 or another method. Before forwarding the DL data to the ES, the DS-TT subtracts the receiving time added by the NW-TT to the DL data from a current time of the DL data, to obtain a transmission delay value of the time synchronization message in the entire 5G system, accumulates the delay value to a previous transmission time (on the CorrectionField domain of the received time synchronization message) from the TSN grand master clock to the NW-TT to obtain an updated transmission delay value, and marks the updated transmission delay value on the CorrectionField domain of the time synchronization message (namely, an entire transmission delay of the message), and deletes the receiving time marked by the NW-TT before. The modified time synchronization message is then transmitted to the ES.

The ES may obtain, according to the delay value marked by the DS-TT on the time synchronization message (namely, the value of the CorrectionField domain of the time synchronization message), an entire transmission delay of the time synchronization message from the TSN grand master clock to the ES by directly adding a transmission delay between the DS-TT and the ES (the transmission delay between the ES and the DS-TT may be obtained according to the method shown in FIG. 1 or another method) to the delay value of the time synchronization message. A calculation time value may be obtained by adding the entire transmission delay to a value of the originTimestamp domain of the time synchronization message, and a clock of the UE is then set to the calculation time value, thereby implementing time synchronization between the UE side ES and the TSN GM.

FIG. 3 is a schematic diagram of an architecture required by time synchronization in a 5G R17 standard.

In FIG. 2, the time of the UE side ES needs to be synchronized to the UPF/NW-TT side TSN GM. However, in the new 5G standard to be stipulated, as shown in FIG. 3, the TSN GM (namely, the grand master clock of the TSN) is on a UE1 side. In this way, the UPF/NW-TT side ES and an ES on another UE (for example, a UE2 shown in FIG. 3) need to perform time synchronization with the UE1 side TSN GM. That is, the TSN GM transmits the time synchronization message through uplink data by using a user plane of the UE1 to the UPF entity.

For TSN ESs outside the UPF entity, the time synchronization message is transmitted to the TSN ESs through the NW-TT. For an ES on the UE2 located at the lower left corner of FIG. 3, the UPF entity transmits the time synchronization message to the UE2 through DL data of the UE2, and then transmits the time synchronization message to the TSN ES through a DS-TT of the UE2.

In FIG. 3, a DS-TT of the UE1 records a receiving time of an uplink (hereinafter referred to as UL for short) data packet including the time synchronization message by the UE1 and transmitted by the TSN GM, and makes the receiving time on the UL time synchronization message data packet, and updates a value of a CorrectionField domain in the data packet into a sum of the original value of the CorrectionField domain and a transmission delay value between the DS-TT and the TSN GM, where the transmission delay between the DS-TT and the TSN GM may be obtained according to the method shown in FIG. 1 or another method. The NW-TT subtracts the receiving time marked by the UE1 DS-TT from a time at which the NW-TT receives the UL data packet, to obtain an entire transmission delay value of the UL data packet in the 5G system, accumulates the delay value to a previous transmission time from the TSN GM to the UE1 DS-TT (on the CorrectionField domain of the received time synchronization message) to obtain an updated transmission delay value, marks the updated transmission delay value on the CorrectionField domain of the UL time synchronization message data packet, deletes the receiving time tag marked by the UE1, and then transmits the UL data packet to TSN ESs (including TSN ESs of a TSN time domain 1 and TSN ESs of a TSN time domain 2) connected to a NW-TT on a right side. According to the method described in FIG. 2, the TSN ES connected to the NW-TT on the right side may obtain, according to the delay value marked by the NW-TT on the time synchronization message (namely, the value of the CorrectionField domain of the time synchronization message), an entire transmission delay of the time synchronization message from the TSN GM to the TSN ES connected to the NW-TT by directly adding a transmission delay between the NW-TT and the TSN ES to the delay value of the time synchronization message. A calculation time value may be obtained by adding the entire transmission delay to a value of an originTimestamp domain of the time synchronization message, and a clock of the TSN ES is then set to the calculation time value, thereby implementing time synchronization between the NW-TT side TSN ES and the UE1 side TSN GM.

In event that the time synchronization message is to be transmitted to the UE2 TSN ES, the UPF entity transmits the time synchronization message to the UE2 through a user plane of the UE2, and the time synchronization message then reaches the DS-TT of the UE2. Similarly, the UE2 DS-TT subtracts the receiving time marked by the UE1 DS-TT on the DL time synchronization message packet from a time at which the UE2 DS-TT receives the DL packet including the time synchronization message, to obtain a transmission delay value of the entire data packet including the time synchronization message in the 5G system, accumulates the transmission delay value to a previous transmission time from the TSN GM to the UE1 DS-TT (on the CorrectionField domain of the received time synchronization message) to obtain an updated transmission delay value, marks the updated transmission delay value on the CorrectionField domain of the DL data packet including the time synchronization message, deletes the receiving time tag marked by the UE1 DS-TT, and then transmits the DL data packet to the TSN ES on the UE2 DS-TT. Similarly, according to the method described above, the TSN ES on the UE2 DS-TT can implement time synchronization with the UE1 side TSN GM.

In FIG. 3, a solid-line arrow represents a gPTP by ingress DS-TT; and a dotted-line arrow represents a locally-switched gPTP by ingress DS-TT.

Due to the diversity of deployment, the UE1 DS-TT in FIG. 3 is connected to the TSN GM Domain 1 and the TSN GM Domain 2 at the same time, alternatively, the UE1 DS-TT may be connected to the TSN GM Domain 1, and a UE X DS-TT is connected to the TSN GM Domain 2. In addition, the UE2 DS-TT in FIG. 3 may be only connected to an ES of one TSN GM domain, alternatively, the UE2 DS-TT may be connected to a plurality of ESs, and each ES respectively corresponds to a different TSN GM Domain. In summary, one UE DS-TT may be connected to one or more GMs or ESs of different TSN GM Domains; and one UE DS-TT may be connected to one GM of a TSN GM Domain X and connected to an ES of a TSN GM Domain Y, or another connection manner may be used.

Under the foregoing technical background, it is a technical problem to be urgently resolved about how to synchronize (or desynchronize) a specific UE or a specific group of UEs or all UEs to a time domain immediately (simultaneously) or how to synchronize (or desynchronize) a specific UE or a specific group of UEs or all UEs to a time domain at a specific time (simultaneously). Therefore, an embodiment of this application provides a solution in which an application function (AF) entity uses a device trigger technology to transmit a message including a trigger condition to one UE or one group of UEs, to trigger the UE to perform a TSN time synchronization activation or deactivation operation, and a time requirement on the UE performing TSN time synchronization may be added to the trigger condition.

The implementation details of the technical solution of this embodiment of this application are described in detail in the following:

FIG. 4 is a flowchart of a time synchronization method according to an embodiment of this application, and the time synchronization method may be implemented by a network exposure function (NEF) entity. Referring to FIG. 4, the time synchronization method includes at least step S410 and step S420. A detailed description is as follows:

Step S410: Receiving a triggering delivery service request message transmitted by an application function (AF) entity, the triggering delivery service request message including an identifier of a target user equipment and a time sensitive network (TSN) trigger container, the TSN trigger container being used for indicating a TSN time synchronization trigger condition.

In an embodiment of this application, the target user equipment is a user equipment that needs to perform TSN time synchronization triggering. The TSN trigger container may include at least the following information: a TSN clock domain identifier, first field information used for indicating uplink TSN synchronization or downlink TSN synchronization, second field information used for indicating an activation operation or a deactivation operation, network slice information, and a data network name.

The TSN clock domain identifier is used for identifying a TSN clock domain to which the target user equipment needs to be synchronized. The first field information is used for indicating uplink TSN synchronization or downlink TSN synchronization. For example, a first value of the first field information represents uplink TSN synchronization, and a second value of the first field information represents downlink TSN synchronization. The second field information is used for indicating an activation operation or a deactivation operation. For example, a first value of the second field information represents an activation operation, and a second value of the second field information represents a deactivation operation. The network slice information may be single network slice selection assistance information, which is referred to as S-NSSAI for short and used for identifying a network slice. The data network name is referred to as DNN for short.

Step S420: Transmitting a submission triggering message to a short message service-service center (SMS-SC), the submission triggering message being used for requesting the SMS-SC to transmit a short message including the TSN trigger container to the target user equipment, to enable the target user equipment to perform a TSN time synchronization operation based on the TSN trigger container.

In an embodiment of this application, before transmitting a submission triggering message to an SMS-SC, the NEF entity may convert the identifier of the target user equipment from an external identifier to a network identifier. In event that the identifier of the target user equipment includes an external identifier of a single user equipment, the external identifier of the single user equipment is converted into a network identifier of the single user equipment; and in event that the identifier of the target user equipment includes an external group identifier corresponding to a plurality of user equipments, the external group identifier is converted into a network identifier list of the plurality of user equipments.

For example, the external identifier of the user equipment may be a phone number. The network identifier of the user equipment may be, for example, an international mobile subscriber identity (IMSI), a generic public subscription identifier (GPSI), or a subscription permanent identifier.

In an embodiment of this application, in event that the identifier of the target user equipment includes the external group identifier corresponding to the plurality of user equipments, the network identifier list of the plurality of user equipments is obtained after conversion, so that when a submission triggering message is transmitted to the SMS-SC, a submission triggering message needs to be transmitted to the SMS-SC for each user equipment in the network identifier list.

In an embodiment of this application, the AF entity may decide one of a UE side and a network side (for example, the NEF entity or the SMS-SC) to control a moment at which the UE performs the TSN time synchronization operation. For example, in event that the triggering delivery service request message transmitted by the AF entity to the NEF entity includes user equipment trigger time information, it indicates that the AF entity decides the network side to control the moment at which the UE performs the TSN time synchronization operation; and in event that the TSN trigger container in the triggering delivery service request message transmitted by the AF entity to the NEF entity includes TSN activation time information, it indicates that the AF entity decides the UE to control a moment at which the UE performs the TSN time synchronization operation.

In addition, in event that the AF entity decides the network side to control the moment at which the UE performs the TSN time synchronization operation, a service provider decides one of the NEF entity or the SMS-SC to perform time control.

In an embodiment of this application, in response to determining, according to a configuration of a carrier network, that the NEF entity controls the moment at which the target user equipment performs the TSN time synchronization operation, the NEF entity may control the moment at which the target UE performs the TSN time synchronization operation by controlling a moment transmitting the submission triggering message to the SMS-SC. Details are as follows:

1) in event that user equipment trigger time information included in the triggering delivery service request message instructs to perform a user equipment trigger operation immediately or the triggering delivery service request message does not include the user equipment trigger time information, the NEF entity may transmit the submission triggering message to the SMS-SC immediately, to trigger the SMS-SC to transmit the short message to the target UE immediately, and the target UE performs the TSN time synchronization operation immediately after receiving the short message (the TSN time synchronization operation performed by the target UE includes an activation operation and a deactivation operation, which may be specifically determined according to a value of the second field information included in the TSN trigger container).

2) in event that user equipment trigger time information included in the triggering delivery service request message instructs to perform a user equipment trigger operation after a predetermined time, the NEF entity may transmit the submission triggering message to the SMS-SC after the predetermined time of receiving the triggering delivery service request message. In this case, the NEF entity performs time control, so that after receiving the submission triggering message, the SMS-SC transmits the short message to the target UE immediately, and the target UE performs the TSN time synchronization operation immediately after receiving the short message.

3) in event that user equipment trigger time information included in the triggering delivery service request message instructs to perform a user equipment trigger operation at a specified time point, the NEF entity transmits the submission triggering message to the SMS-SC in response to a current time reaching the specified time point. Similarly, in this case, the NEF entity performs time control, so that after receiving the submission triggering message, the SMS-SC transmits the short message to the target UE immediately, and the target UE performs the TSN time synchronization operation immediately after receiving the short message.

4) in event that user equipment trigger time information included in the triggering delivery service request message instructs to perform a user equipment trigger operation at a specified time point, but a current time at the NEF entity exceeds the specified time point, the NEF entity transmits the submission triggering message to the SMS-SC immediately. In this case, after receiving the submission triggering message, the SMS-SC transmits the short message to the target UE immediately, and the target UE performs the TSN time synchronization operation immediately after receiving the short message.

In an embodiment of this application, in event that the NEF entity does not control the moment at which the target UE performs the TSN time synchronization operation, after receiving the triggering delivery service request message transmitted by the AF entity and performing necessary processing (for example, converting the identifier of the target UE), the NEF entity directly transmits the submission triggering message to the SMS-SC (for example, in event that the identifier of the target user equipment includes an external group identifier corresponding to a plurality of user equipments, a network identifier list of the plurality of user equipments is obtained after conversion, and in response to transmitting the submission triggering message to the SMS-SC, the NEF entity needs to respectively transmit a submission triggering message to the SMS-SC for each user equipment in the network identifier list). In this case, the submission triggering message transmitted by the NEF entity to the SMS-SC may include short message delivery time information, and the short message delivery time information is used for indicating a time at which the SMS-SC transmits the short message to the target UE, to indirectly control the moment at which the target UE performs the TSN time synchronization operation. A value of the short message delivery time information is from the user equipment trigger time information in the triggering delivery service request message transmitted by the AF entity to the NEF entity, that is, the NEF entity may set the short message delivery time information by using the user equipment trigger time information.

In an embodiment of this application, in event that the submission triggering message includes the short message delivery time information, the short message delivery time information is used for instructing the SMS-SC to transmit the short message immediately after receiving the submission triggering message, or instructing the SMS-SC to transmit the short message after a predetermined time of receiving the submission triggering message, or instructing the SMS-SC to transmit the short message at a specified time point, the short message delivery time information being from the triggering delivery service request message.

In an embodiment of this application, the submission triggering message may further not include the short message delivery time information. In this case, the SMS immediately transmits the short message to the target UE after receiving the submission triggering message.

In an embodiment of this application, in event that the AF entity does not need the network (for example, the NEF entity or the SMS-SC) to control the moment at which the target UE performs the TSN time synchronization operation, and the target UE controls the moment at which the target UE performs the TSN time synchronization operation, the AF entity may alternatively add activation time information to the TSN trigger container, and the TSN trigger container included in a trigger message (for example, the submission triggering message transmitted by the NEF entity to the SMS-SC and the short message transmitted by the SMS-SC to the UE) transmitted by the network to the UE also includes the TSN activation time information, where the TSN activation time information is used for indicating the moment at which the target UE performs the TSN time synchronization operation.

In an embodiment of this application, in event that the TSN trigger container includes the TSN activation time information, the TSN activation time information may be used for instructing the target user equipment to perform the TSN time synchronization operation immediately after receiving the short message, or instructing the target user equipment to perform the TSN time synchronization operation after a predetermined time of receiving the short message, or instructing the target user equipment to perform the TSN time synchronization operation at a specified time point.

Figure 5:
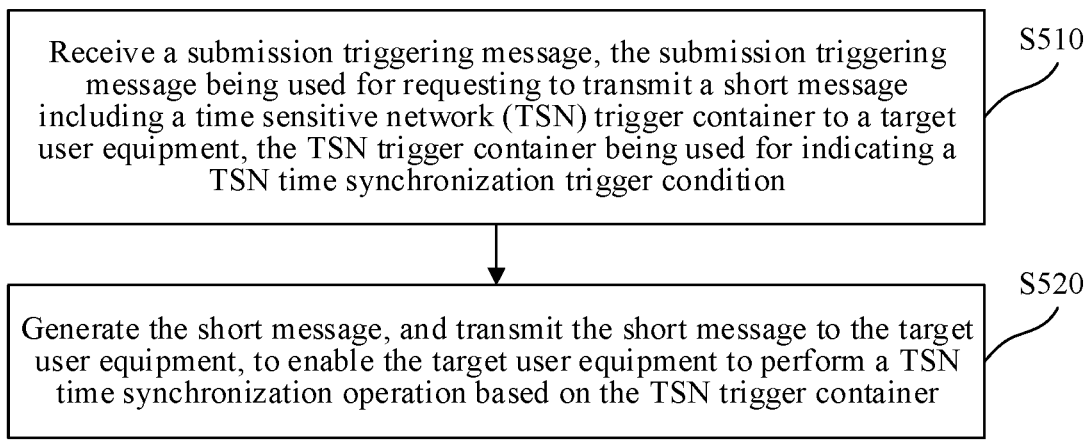
FIG. 5 is a flowchart of a time synchronization method according to an embodiment of this application.

The embodiment shown in FIG. 4 is described in terms of the NEF entity, and the following describes the time synchronization method provided in the embodiments of this application in terms of the SMS-SC with reference to FIG. 5.

Referring to FIG. 5, the time synchronization method may be performed by the SMS-SC and include at least step S510 and step S520. A detailed description is as follows:

Step S510: Receiving a submission triggering message, the submission triggering message being used for requesting to transmit a short message including a time sensitive network (TSN) trigger container to a target user equipment, the TSN trigger container being used for indicating a TSN time synchronization trigger condition.

In an embodiment of this application, the SMS-SC may receive the submission triggering message transmitted by the NEF entity, and for a process that the NEF entity transmits the submission triggering message, reference may be made to the technical solution of the foregoing embodiment. Information included in the TSN trigger container may be from the triggering delivery service request message transmitted by the AF entity to the NEF entity.

Similar to the foregoing embodiment, the target user equipment is a user equipment that needs to perform TSN time synchronization triggering/operations. The TSN trigger container includes at least the following information: a TSN clock domain identifier, first field information used for indicating uplink TSN synchronization or downlink TSN synchronization, second field information used for indicating an activation operation or a deactivation operation, network slice information, and a data network name. According to the description of the process that the NEF entity transmits the submission triggering message in the foregoing embodiment, in the TSN trigger container included in the submission triggering message, the network identifier of the target user equipment after conversion may be included.

Step S520: Generating a short message according to the submission triggering message, and transmitting the short message to the target user equipment, to enable the target user equipment to perform a TSN time synchronization operation based on the TSN trigger container.

In an embodiment of this application, the SMS-SC may control a moment transmitting the short message to the target UE to control a moment at which the target UE performs the TSN time synchronization operation. Details are as follows:

1) in event that short message delivery time information included in the submission triggering message instructs to transmit the short message immediately or the submission triggering message does not include short message delivery time information, the SMS-SC transmits the short message to the target UE immediately, and the target UE performs the TSN time synchronization operation immediately after receiving the short message.

In event that the submission triggering message does not include short message delivery time information may include the following several situations: one is that the NEF entity already performs time control when transmitting the submission triggering message to the SMS-SC, the SMS-SC and the target UE do not need to perform time control in this case, the SMS transmits the short message to the target UE immediately when receiving the submission triggering message, and the target UE performs the TSN time synchronization operation immediately after receiving the short message; another situation is that the NEF entity and the SMS-SC do not perform time control, and the target UE performs time control, that is, the target UE determines the moment performing the TSN time synchronization operation according to TSN activation time information included in the received short message; and still another situation is that the NEF entity, the SMS-SC, and the target UE do not perform time control, in this case, after receiving the triggering delivery service request message transmitted by the AF entity and performing necessary processing (for example, converting the identifier of the target UE), the NEF entity directly transmits the submission triggering message to the SMS-SC, the SMS-SC transmits the short message to the target UE immediately after receiving the submission triggering message, and the target UE performs the TSN time synchronization operation immediately after receiving the short message.

2) in event that short message delivery time information included in the submission triggering message instructs to transmit the short message after a predetermined time, the SMS-SC transmits the short message to the target UE after the predetermined time of receiving the submission triggering message, and the target UE performs the TSN time synchronization operation immediately after receiving the short message.

3) in event that short message delivery time information included in the submission triggering message instructs to transmit the short message at a specified time point, the SMS-SC transmits the short message to the target UE in event that a current time reaches the specified time, and the target UE performs the TSN time synchronization operation immediately after receiving the short message.

4) in event that short message delivery time information included in the submission triggering message instructs to transmit the short message at a specified time point, but a current time exceeds the specified time point, the SMS-SC transmits the short message to the target user equipment immediately, and the target UE performs the TSN time synchronization operation immediately after receiving the short message.

Figure 6:
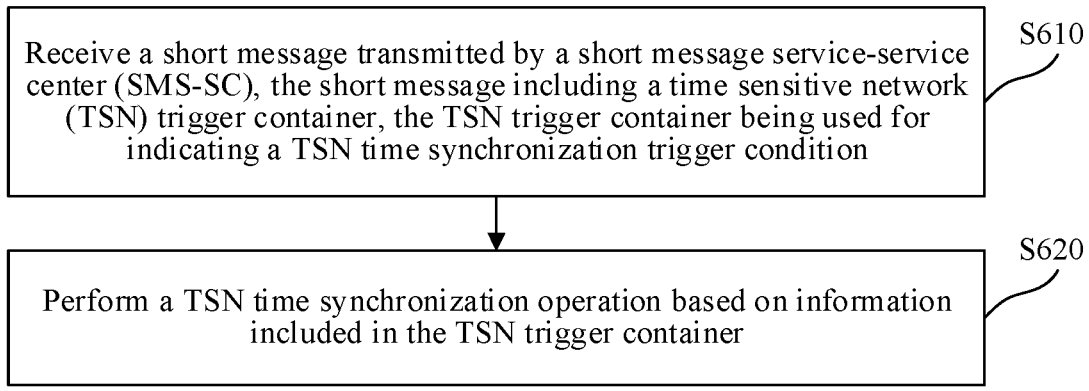
FIG. 6 is a flowchart of a time synchronization method according to an embodiment of this application.

The technical solution of the embodiments of this application is described in terms of the NEF entity and the SMS-SC respectively, and the following describes the time synchronization method of the embodiments of this application in terms of a UE (the target UE) with reference to FIG. 6. Referring to FIG. 6, the time synchronization method may be performed by a UE and include at least step S610 and step S620. A detailed description is as follows:

Step S610: Receiving a short message transmitted by a short message service-service center (SMS-SC), the short message including a time sensitive network (TSN) trigger container, the TSN trigger container being used for indicating a TSN time synchronization trigger condition.

In an embodiment of this application, for a process that the SMS-SC transmits the short message, reference may be made to the technical solution of the foregoing embodiment. Information included in the TSN trigger container may be from the submission triggering message transmitted by the NEF entity to the SMS-SC, and an original source of the information is from the triggering delivery service request message transmitted by the AF entity.

In an embodiment of this application, the TSN trigger container included in the short message may include the following information: a TSN clock domain identifier, first field information used for indicating uplink TSN synchronization or downlink TSN synchronization, second field information used for indicating an activation operation or a deactivation operation, network slice information, and a data network name. Parameters and parameter values in the TSN trigger container included in the short message are from the submission triggering message transmitted by the NEF entity to the SMS-SC, and parameters and parameter values included in the submission triggering message are from the triggering delivery service request message transmitted by the AF entity to the NEF entity.

Step S620: Performing a TSN time synchronization operation based on information included in the TSN trigger container.

In the embodiments of this application, the TSN trigger container includes second field information used for indicating an activation operation or a deactivation operation, and a description is made below by using an example in which the second field information indicates an activation operation and indicates a deactivation operation respectively.

In an embodiment of this application, in event that the second field information indicates an activation operation, and the UE performs the TSN time synchronization operation after receiving the short message may include the following several situations:

1) in event that the TSN trigger container includes TSN activation time information, the TSN activation time information instructs the user equipment to perform the TSN time synchronization operation immediately after receiving the short message, and the second field information indicates an activation operation, the UE establishes a protocol data unit (PDU) session to perform the TSN time synchronization operation immediately. For a PDU session establishment process initiated by the UE, reference may be made to a chapter 4.3.2 of a third generation partnership project (3GPP) protocol TS23.502.

The following parameters may be included in a PDU session establishment request transmitted by the UE during establishment of the PDU session, and the following parameters and values of the parameters are from the TSN trigger container included in the short message: a TSN clock domain identifier, first field information used for indicating uplink TSN synchronization or downlink TSN synchronization, second field information used for indicating an activation operation, network slice information, and a data network name.

2) in event that the TSN trigger container includes TSN activation time information, the TSN activation time information instructs the user equipment to perform the TSN time synchronization operation after a predetermined time of receiving the short message, and the second field information indicates an activation operation, the UE establishes a PDU session to perform the TSN time synchronization operation after the predetermined time of receiving the short message.

3) in event that the TSN trigger container includes TSN activation time information, the TSN activation time information instructs the user equipment to perform the TSN time synchronization operation at a specified time point, and the second field information indicates an activation operation, the UE establishes a PDU session to perform the TSN time synchronization operation in event that a current time reaches the specified time point.

4) in event that the TSN trigger container includes TSN activation time information, the TSN activation time information instructs the user equipment to perform the TSN time synchronization operation at a specified time point, the second field information indicates an activation operation, but a current time exceeds the specified time point, the UE establishes a PDU session to perform the TSN time synchronization operation immediately.

5) in event that the TSN trigger container does not include TSN activation time information, and the second field information instructs the user equipment to perform an activation operation, the UE establishes a PDU session to perform the TSN time synchronization operation immediately.

In event that the TSN trigger container does not include the TSN activation time information may include the following several situations: one is that the NEF entity already performs time control when transmitting the submission triggering message to the SMS-SC, the SMS-SC and the UE do not need to perform time control in this case, the SMS transmits the short message to the UE immediately when receiving the submission triggering message, and the UE performs the TSN time synchronization operation immediately after receiving the short message; another situation is that the NEF entity does not perform time control, and the SMS-SC performs time control, in this case, after receiving the submission triggering message, the SMS-SC determines when to transmit the short message to the UE according to short message delivery time information included in the submission triggering message, and the UE performs the TSN time synchronization operation immediately after receiving the short message; and still another situation is that the NEF entity, the SMS-SC, and the UE do not perform time control, in this case, after receiving the triggering delivery service request message transmitted by the AF entity and performing necessary processing (for example, converting the identifier of the UE), the NEF entity directly transmits the submission triggering message to the SMS-SC, the SMS-SC transmits the short message to the UE immediately after receiving the submission triggering message, and the UE performs the TSN time synchronization operation immediately after receiving the short message.

In an embodiment of this application, in event that the TSN activation time information instructs the user equipment to perform the TSN time synchronization operation after a predetermined time of receiving the short message, and the second field information indicates an activation operation, after the predetermined time of receiving the short message, the UE may first detect whether a signaling connection with a network is in an idle state. In event that the UE is in a connection management idle state (CM-IDLE state), a service request process is performed to establish a signaling connection with an access and mobility management function (AMF) entity, and after the signaling connection is established, a PDU session may be established to perform the TSN time synchronization operation. In event that the UE is in a connection management connected state (CM-CONNECTED state), a PDU session may be directly established to perform the TSN time synchronization operation.

Similarly, in event that the TSN activation time information instructs the user equipment to perform the TSN time synchronization operation at a specified time point, and the second field information indicates an activation operation, and a current time reaches the specified time point, the UE may first detect whether a signaling connection with a network is in an idle state. In event that the UE is in a connection management idle state (CM-IDLE state), a service request process is performed to establish a signaling connection with an AMF entity, and after the signaling connection is established, a PDU session may be established to perform the TSN time synchronization operation. In event that the UE is in a connection management connected state (CM-CONNECTED state), a PDU session may be directly established to perform the TSN time synchronization operation.

In a 5GS network architecture, a connection management (CM) state of the UE includes: a CM-IDLE state (namely, an idle state) and a CM-CONNECTED (namely, a connected state), and the CM reflects signaling connection characteristics of the UE. In the idle state (CM-IDLE), there is no non-access stratum (NAS) signaling connection between the UE and the network, for example, a radio resource control connection and a N1-AMF connection are not included; and in the connected state (CM-CONNECTED), there is a NAS signaling connection between the UE and the network, which includes a RRC connection and a N1-AMF connection.

In an embodiment of this application, in event that the second field information indicates a deactivation operation, the UE performing the TSN time synchronization operation after receiving the short message may include the following several situations:

1) in event that the TSN trigger container includes TSN activation time information, the TSN activation time information instructs the user equipment to perform the TSN time synchronization operation immediately after receiving the short message, and the second field information indicates a deactivation operation, the UE releases a PDU session or initiates a PDU session modification process immediately. For a PDU session release process initiated by the UE, reference may be made to a chapter 4.3.4.2 of the 3GPP protocol TS23.502; and for a PDU session modification process initiated by the UE, reference may be made to a chapter 4.3.2.2 of the 3GPP protocol TS23.502.

2) in event that the TSN trigger container includes TSN activation time information, the TSN activation time information instructs the user equipment to perform the TSN time synchronization operation after a predetermined time of receiving the short message, and the second field information indicates a deactivation operation, the UE releases a PDU session or initiates a PDU session modification process after the predetermined time of receiving the short message.

3) in event that the TSN trigger container includes TSN activation time information, the TSN activation time information instructs the user equipment to perform the TSN time synchronization operation at a specified time point, and the second field information indicates a deactivation operation, the UE releases a PDU session or initiates a PDU session modification process in event that a current time reaches the specified time point.

4) in event that the TSN trigger container includes TSN activation time information, the TSN activation time information instructs the user equipment to perform the TSN time synchronization operation at a specified time point, the second field information indicates a deactivation operation, but a current time exceeds the specified time point, the UE releases a PDU session or initiates a PDU session modification process immediately.

5) in event that the TSN trigger container does not include TSN activation time information, and the second field information instructs the user equipment to perform a deactivation operation, the UE releases a PDU session or initiates a PDU session modification process immediately.

Similar to the foregoing embodiment, event that the TSN trigger container does not include the TSN activation time information may include the following several situations: one is that the NEF entity already performs time control when transmitting the submission triggering message to the SMS-SC, the SMS-SC and the UE do not need to perform time control in this case, the SMS transmits the short message to the UE immediately when receiving the submission triggering message, and the UE performs the TSN time synchronization operation immediately after receiving the short message; another situation is that the NEF entity does not perform time control, and the SMS-SC performs time control, in this case, after receiving the submission triggering message, the SMS-SC determines when to transmit the short message to the UE according to short message delivery time information included in the submission triggering message, and the UE performs the TSN time synchronization operation immediately after receiving the short message; and still another situation is that the NEF entity, the SMS-SC, and the UE do not perform time control, in this case, after receiving the triggering delivery service request message transmitted by the AF entity and performing necessary processing (for example, converting the identifier of the UE), the NEF entity directly transmits the submission triggering message to the SMS-SC, the SMS-SC transmits the short message to the UE immediately after receiving the submission triggering message, and the UE performs the TSN time synchronization operation immediately after receiving the short message.

In an embodiment of this application, in event that the TSN activation time information instructs the user equipment to perform the TSN time synchronization operation after a predetermined time of receiving the short message, and the second field information indicates a deactivation operation, after the predetermined time of receiving the short message, the UE may first detect whether a signaling connection with a network is in an idle state. In event that the UE is in a connection management idle state (CM-IDLE state), a service request process is performed to establish a signaling connection with an AMF entity, and after the signaling connection is established, a PDU session release process or a PDU session modification process may be initiated. In event that the UE is in a connection management connected state (CM-CONNECTED state), a PDU session release process or a PDU session modification process may be directly initiated.

Similarly, in event that the TSN activation time information instructs the user equipment to perform the TSN time synchronization operation at a specified time point, the second field information indicates a deactivation operation, and a current time reaches the specified time point, the UE may first detect whether a signaling connection with a network is in an idle state. In event that the UE is in a connection management idle state (CM-IDLE state), a service request process is performed to establish a signaling connection with an AMF entity, and after the signaling connection is established, a PDU session release process or a PDU session modification process may be initiated. In event that the UE is in a connection management connected state (CM-CONNECTED state), a PDU session release process or a PDU session modification process may be directly initiated.

In an embodiment of this application, when the UE initiates a PDU session modification process, a generated PDU session modification request may include an identifier of a target TSN clock domain that needs to be deactivated, and the PDU session modification request is then transmitted to a session management function (SMF) entity, to enable the SMF entity to instruct a user plane function (UPF) entity to stop forwarding TSN time synchronization data of the target TSN clock domain to the UE transmitting the PDU session modification request.

In an embodiment of this application, a PDU session established by the user equipment may support time synchronization operations of a plurality of TSN clock domains. In this case, the PDU session modification process is initiated in event that a target TSN time domain that needs to be deactivated, network slice information, and a data network name included in the TSN trigger container respectively match a TSN time domain, network slice information, and a data network name of the PDU session established by the target user equipment, and the target TSN clock domain that needs to be deactivated indicated by the TSN trigger container is not the last TSN clock domain in the PDU session; and the PDU session release process is initiated to release the PDU session in event that the target TSN clock domain that needs to be deactivated, the network slice information, and the data network name included in the TSN trigger container respectively match the TSN time domain, the network slice information, and the data network name of the PDU session established by the target user equipment, and the target TSN clock domain that needs to be deactivated indicated by the TSN trigger container is the last TSN clock domain in the PDU session.

The technical solution of the embodiments of this application is described in terms of the NEF entity, the SMS-SC, and the UE respectively, and the following describes implementation details of the technical solution of the embodiments of this application in terms of interaction among entities with reference to FIG. 7 to FIG. 12.

Figure 7:
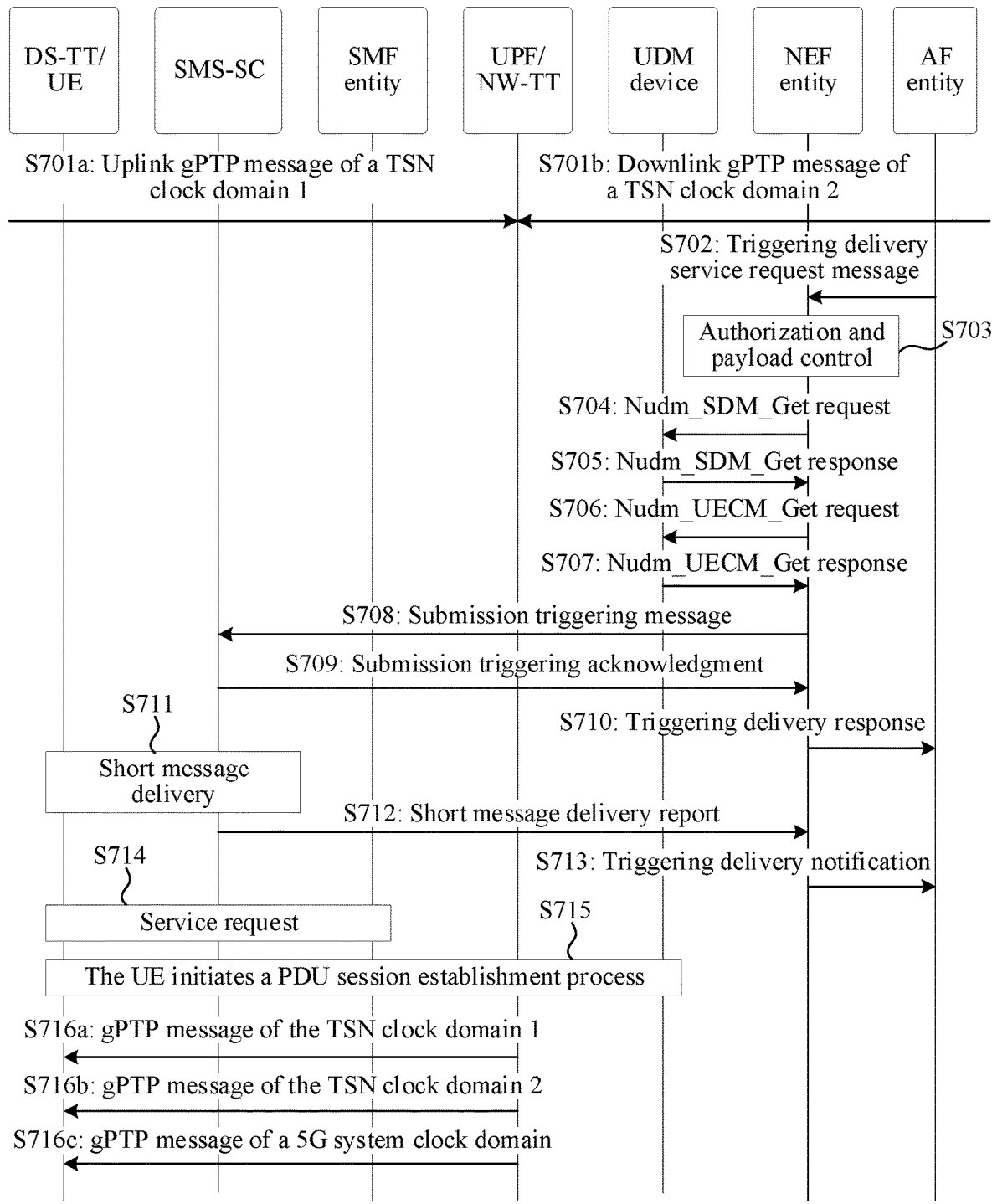
FIG. 7 is a flowchart of performing a time sensitive network (TSN) time synchronization activation operation under control of a user equipment (UE) according to an embodiment of this application.

In this embodiment of this application, the NEF entity, the SMS-SC, and the UE can all control the moment at which the UE performs the TSN time synchronization operation, and detailed descriptions are listed one by one as follows:

1. An embodiment in which the UE controls the moment performing the TSN time synchronization operation (divided into an activation process and a deactivation process):

FIG. 7 shows a process of performing a TSN time synchronization activation operation under control of a UE according to an embodiment of this application, and the process includes the following steps:

Step S701*a*: A grand master clock of a TSN domain 1 transmits an uplink gPTP message of the TSN clock domain 1 to a UPF entity/NW-TT through a UE (the UE is not the DS-TT/UE shown in FIG. 7); and Step S701*b*: A grand master clock of a TSN domain 2 transmits a downlink gPTP message of the TSN clock domain 2 to the UPF entity/NW-TT through a terminal device (for example, another UE). Messages of step S701*a* and step S701*b* are respectively used for performing TSN time synchronization operations of different TSN time domains.

Step S702: An AF entity transmits a triggering delivery service request message to a NEF entity.

In an embodiment of this application, for a specific process of step S702, reference may be made to step 2 in the procedure of "Application Triggering" service in a chapter 4.13.2.2 of the 3GPP protocol TS23.502. However, the triggering delivery service request message in this embodiment of this application includes an identifier of a target user equipment (or referred to as a target ID) and a TSN trigger container.

The target ID refers to a specific UE or a group of UEs. In event that the target ID refers to a specific UE, the target ID is generally a SUPI, an IMSI, a GPSI, or another external application identifier. In event that the target ID refers to a group of UEs, the target ID is generally an external group ID.

The TSN trigger container may include a TSN activation time, a TSN domain ID (TSN clock domain identifier), UL or DL TSN synchronization, an activation/deactivation indicator (an activation operation or a deactivation operation), S-NSSAI, and a DNN. The TSN activation time may be used for instructing to perform a TSN time synchronization activation (or deactivation) operation immediately, or perform a TSN time synchronization activation (or deactivation) operation after X seconds of the message (triggering delivery service request message), or perform a TSN time synchronization activation (or deactivation) operation at a specified time point. The embodiment shown in FIG. 7 is a TSN time synchronization activation operation, so that a value of the activation/deactivation indicator is activation.

Step S703: The NEF entity performs authorization and payload control processing. Specifically, the NEF entity checks whether the AF entity has a right to transmit a trigger request and whether the AF entity does not exceed a Nnef quota or a trigger submission speed rate. In event that the check fails, a reason value of a Nnef_Trigger_Delivery response (a trigger delivery response of step S710) transmitted by the NEF entity indicates a reason for the failure situation, and the process stops at this step. Otherwise, step S704 of the process continues to be performed.

Step S704: The NEF entity transmits a Nudm_SDM_Get request to a unified data management (UDM) device.

In an embodiment of this application, the Nudm_SDM_Get request may include the following parameters: identifier translation, the target ID, and an AF identifier.

Step S705: The UDM device transmits a Nudm_SDM_Get response to the NEF entity.

In an embodiment of this application, the Nudm_SDM_Get response includes the following parameters: a SUPI, and optionally, a mobile station international integrated service digital network number (MSISDN).

As described above, the target ID may refer to a group of UEs. In event that the target ID refers to a group of UEs, the target ID is generally an external group ID, and a reply of step S705 is a SUPI list and an MSISDN list optionally. In this case, subsequent step S706 to step S716 may perform a similar operation to each SUPI (namely, each UE) in the list.

Step S706: The NEF entity transmits a Nudm_UECM_Get (SUPI, SMS) request to the UDM device, to obtain an address of a short message service function (SMSF) entity.

Step S707: The UDM device transmits a Nudm_UECM_Get (SMSF ID) response to the NEF entity. The SMSF entity is an entity that implements a function of transmitting and receiving short messages from a UE in the 5G system.

Step S708: The NEF entity transmits a submission triggering message (GPSI, SUPI, AF identifier, SMSF ID, SMS application port ID, trigger payload (TSN trigger container), trigger indication) to an SMS-SC. The GPSI and the SUPI are identifiers of the UE; the AF identifier is an identifier of the AF entity; the SMSF ID is an identifier of the SMSF entity; the SMS application port ID is used for indicating an identifier of application to which the UE routes the received short message; and the trigger indication is used for indicating a trigger short message or another short message (the trigger short message is to be routed to a specific application, and the SMS application port ID indicates the specific application).

Step S709: The SMS-SC returns a submission triggering acknowledgment message to the NEF entity, to acknowledge that the SMS-SC receives the submission triggering message of the NEF entity.

Step S710: The NEF entity transmits a triggering delivery response to the AF entity to acknowledge that the triggering delivery service request message of the AF entity is received.

Step S711: The SMS-SC transmits a short message to a target UE. A specific process of this step is described in detail in a chapter 4.13.3.6 and a chapter 4.13.3.7 of TS23.502. For example, a basic process is that the SMS-SC transmits the short message to a short message service-gateway mobile switching center (SMS-GMSC), the SMS-GMSC transmits the short message to the SMSF entity, the SMSF entity transmits the short message to an AMF entity, and the short message finally reaches the UE. In event that the UE is in a CM-IDLE state, the AMF entity further needs to perform a service request process initiated by a network, and then transmits the short message to the UE. After receiving the short message, the UE transmits a short message delivery report to the SMS-SC through the AMF entity, the SMSF entity, and the SMS-GMSC.

Step S712: The SMS-SC transmits a short message delivery report to the NEF entity.

Step S713: The NEF entity transmits a triggering delivery notification to the AF entity.

In addition to the foregoing points that need to be particularly noted, for a specific process of step S702 to step S713, reference may be made to step 2 to step 13 in the procedure of "Application Triggering" service in the chapter 4.13.2.2 of the 3GPP protocol TS23.502.

Step S714: The UE initiates a service request to establish a signaling connection with the AMF entity.

In an embodiment of this application, after the UE receives the TSN trigger container (the TSN trigger container includes the foregoing TSN activation time, TSN domain ID, UL or DL synchronization, activation/deactivation indicator, S-NSSAI, and DNN) included in the short message in step S711, in response to determining that the value of the activation/deactivation indicator is activation, it is determined that a time indicated by the TSN activation time is an activation time.

In event that the TSN activation time instructs to perform a TSN time synchronization operation immediately, because the UE is still in a connected state in this case, step S714 may be skipped, and subsequent steps are directly performed.

In event that the TSN activation time instructs to perform a TSN time synchronization operation after X seconds, the UE determines, after X seconds of receiving the short message in step S711, whether the UE is in a CM-IDLE state. In event that the UE is in a CM-IDLE state, step S714 is performed, a service request process is initiated to establish a signaling connection with the AMF entity, and subsequent processes are then performed; and in event that the UE is in a CM-CONNECTED state after X seconds of receiving the short message in step S711, step S714 may be skipped, and subsequent steps are directly performed.

In event that the TSN activation time instructs to perform a TSN time synchronization operation at a specific time point, the UE determines, in event that a current time reaches the specified time point, whether the UE is in a CM-IDLE state. In event that the UE is in a CM-IDLE state, step S714 is performed, a service request process is initiated to establish a signaling connection with the AMF entity, and subsequent processes are performed; and in event that the UE is still in a connected state at this specified time point, step S714 may be skipped, and subsequent steps are directly performed.

It is assumed herein that the time of the UE is synchronized with a time of the 5G network (the time synchronization is not TSN time synchronization (TSN time synchronization has microsecond level precision, and a synchronization error is less than 1 ms), and this time synchronization refers to that the UE obtains a current local time from the network through NAS signaling (synchronization precision generally falls within 50 ms to 1 second)).

Step S715: The UE initiates a PDU session establishment process.

In an embodiment of this application, for a PDU session establishment process initiated by the UE, reference may be made to the chapter 4.3.2 of the 3GPP protocol TS23.502. A PDU session establishment request initiated by the UE in a N1 SM container may include the following parameters: a TSN domain ID, UL or DL TSN synchronization, activation, S-NSSAI, and a DNN. The PDU session establishment request is transferred to an SMF entity through the AMF entity, and the TSN domain ID, the S-NSSAI, and the DNN are included in a N1 message transmitted to the AMF entity. After a PDU session is established, the SMF entity provides the S-NSSAI, the DNN, and the TSN domain ID when registering to the UDM device, so that the UDM device knows that a process that the UE performs TSN activation has been successfully triggered by comparing the S-NSSAI, the DNN, and the TSN domain ID.

Step S716a: The UPF entity/NW-TT transmits the gPTP message of the TSN clock domain 1 to the UE; and Step S716b: The UPF entity/NW-TT transmits the gPTP message of the TSN clock domain 2 to the UE; and in event that the TSN domain ID indicates a 5G time domain, step S716c: The UPF entity/NW-TT transmits a gPTP message of a 5G system clock domain to the UE.

In an embodiment of this application, for step S716a to step S716c, reference may be made to 3GPP protocol TR23.700-020. In this case, the UPF entity/NW-TT forwards data related to TSN synchronization in different directions according to the TSN domain, to help the UE perform TSN time synchronization processing.

Figure 8:
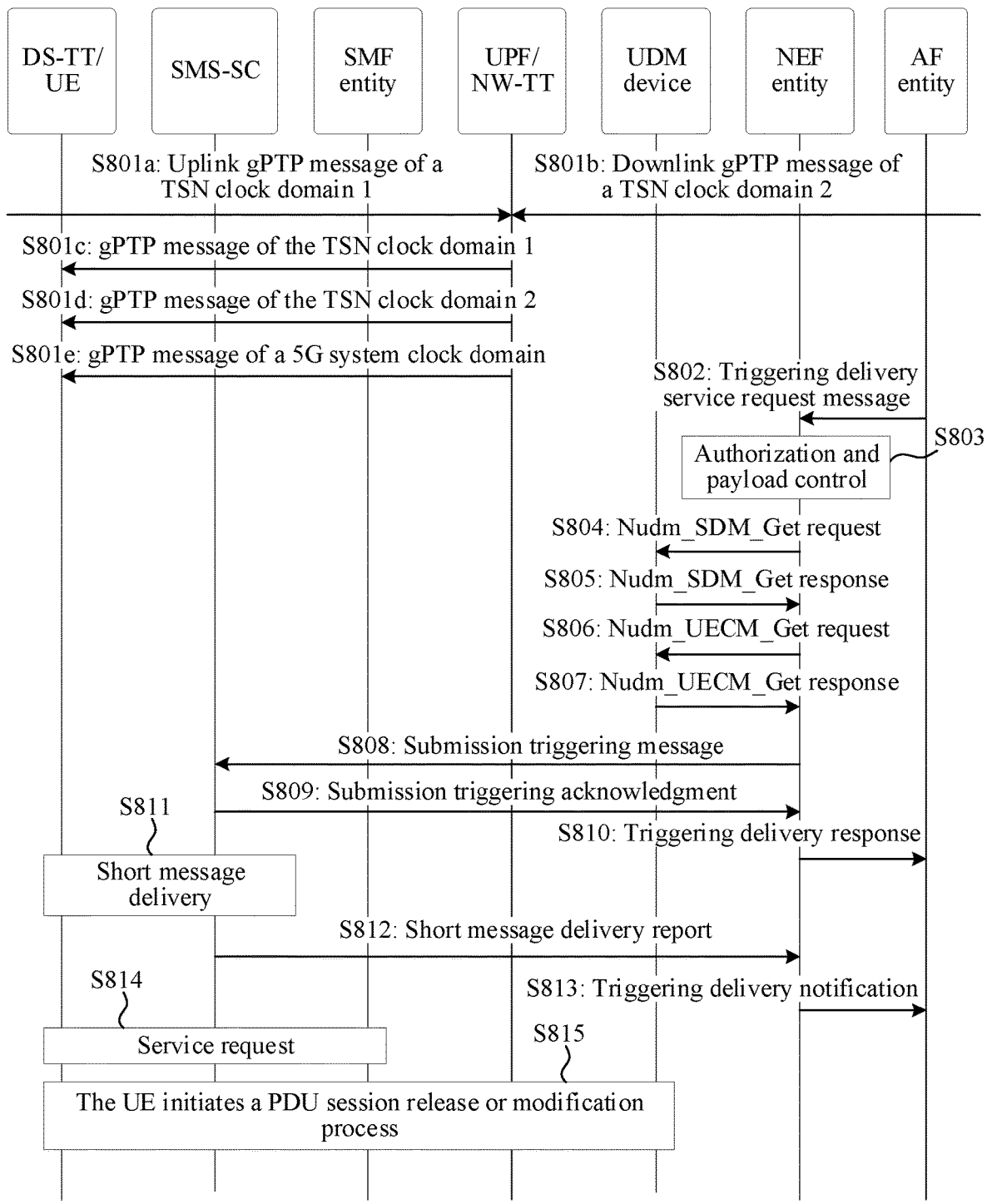
FIG. 8 is a flowchart of performing a TSN time synchronization deactivation operation under control of a UE according to an embodiment of this application.

FIG. 8 shows a process of performing a TSN time synchronization deactivation operation under control of a UE according to an embodiment of this application, and the process includes the following steps:

Step S801a: A grand master clock of a TSN domain 1 transmits an uplink gPTP message of the TSN clock domain 1 to a UPF entity/NW-TT through a UE (the UE is not the DS-TT/UE shown in FIG. 8); Step S801b: A grand master clock of a TSN domain 2 transmits a downlink gPTP message of the TSN clock domain 2 to the UPF entity/NW-TT through a terminal device; Step S801c: The UPF entity/NW-TT transmits the gPTP message of the TSN clock domain 1 to the UE; Step S801d: The UPF entity/NW-TT transmits the gPTP message of the TSN clock domain 2 to the UE; and Step S801e: In event that 5G time domain synchronization is performed, the UPF entity/NW-TT transmits a gPTP message of a 5G system clock domain to the UE. Messages of step S801a to step S801e are respectively used for performing TSN time synchronization operations of different TSN time domains.

Step S802: An AF entity transmits a triggering delivery service request message to a NEF entity.

In an embodiment of this application, a process that the AF entity transmits the triggering delivery service request message is similar to step S702 shown in FIG. 7, but the embodiment shown in FIG. 8 is a TSN time synchronization deactivation operation, so that a value of the activation/deactivation indicator is deactivation.

Step S803: The NEF entity performs authorization and payload control processing. A processing process of this step is similar to step S703 shown in FIG. 7, and details are not described herein again.

Step S804: The NEF entity transmits a Nudm_SDM_Get request to a UDM device. A processing process of this step is similar to step S704 shown in FIG. 7, and details are not described herein again.

Step S805: The UDM device transmits a Nudm_SDM_Get response to the NEF entity. A processing process of this step is similar to step S705 shown in FIG. 7, and details are not described herein again.

Similar to the foregoing description, the target ID may refer to a group of UEs. In event that the target ID refers to a group of UEs, the target ID is generally an external group ID, and a reply of step S805 is a SUPI list and an MSISDN list optionally. In this case, subsequent step S806 to step S815 may perform a similar operation to each SUPI (namely, each UE) in the list.

Step S806: The NEF entity transmits a Nudm_UECM_Get request to the UDM device. A processing process of this step is similar to step S706 shown in FIG. 7, and details are not described herein again.

Step S807: The UDM device transmits a Nudm_UECM_Get response to the NEF entity. A processing process of this step is similar to step S707 shown in FIG. 7, and details are not described herein again.

Step S808: The NEF entity transmits a submission triggering message to an SMS-SC. A processing process of this step is similar to step S708 shown in FIG. 7, and details are not described herein again.

Step S809: The SMS-SC returns a submission triggering acknowledgment message to the NEF entity, to acknowledge that the SMS-SC receives the submission triggering message of the NEF entity.

Step S810: The NEF entity transmits a triggering delivery response to the AF entity to acknowledge that the triggering delivery service request message of the AF entity is received.

Step S811: The SMS-SC transmits a short message to a target UE. A processing process of this step is similar to step S711 shown in FIG. 7, and details are not described herein again.

Step S812: The SMS-SC transmits a short message delivery report to the NEF entity.

Step S813: The NEF entity transmits a triggering delivery notification to the AF entity.

In addition to the foregoing points that need to be particularly noted, for a specific process of step S802 to step S813, reference may be made to step 2 to step 13 in the procedure of "Application Triggering" service in the chapter 4.13.2.2 of the 3GPP protocol TS23.502.

Step S814: The UE initiates a service request to establish a signaling connection with an AMF entity.

In an embodiment of this application, after the UE receives the TSN trigger container (the TSN trigger container includes the foregoing TSN activation time, TSN domain ID, UL or DL synchronization, activation/deactivation indicator, S-NSSAI, and DNN) included in the short message in step S811, in response to determining that the value of the activation/deactivation indicator is deactivation, it is determined that a time indicated by the TSN activation time is a deactivation time.

In event that the TSN activation time instructs to perform a TSN time synchronization operation immediately, because the UE is still in a connected state in this case, step S814 may be skipped, and subsequent steps are directly performed.

In event that the TSN activation time instructs to perform a TSN time synchronization operation after X seconds, the UE determines, after X seconds of receiving the short message in step S811, whether the UE is in a CM-IDLE state. In event that the UE is in a CM-IDLE state, step S814 is performed, a service request process is initiated to establish a signaling connection with the AMF entity, and subsequent processes are then performed; and in event that the UE is in a CM-CONNECTED state after X seconds of receiving the short message in step S811, step S814 may be skipped, and subsequent steps are directly performed.

In event that the TSN activation time instructs to perform a TSN time synchronization operation at a specific time point, and a current time reaches the specified time point, the UE determines whether the UE is in a CM-IDLE state. In event that the UE is in a CM-IDLE state, step S814 is performed, a service request process is initiated to establish a signaling connection with the AMF entity, and subsequent processes are performed; and in event that the UE is still in a connected state at this specified time point, step S814 may be skipped, and subsequent steps are directly performed.

It is assumed herein that the time of the UE is synchronized with a time of the 5G network (the time synchronization is not TSN time synchronization (TSN time synchronization has microsecond level precision, and a synchronization error is less than 1 ms), and this time synchronization refers to that the UE obtains a current local time from the network through NAS signaling (synchronization precision generally falls within 50 ms to 1 second)).

Step S815: The UE initiates a PDU session release process or a PDU session modification process.

In an embodiment of this application, for the PDU session release process initiated by the UE, reference may be made to the chapter 4.3.4.2 of the 3GPP protocol TS23.502; and for the PDU session modification process initiated by the UE, reference may be made to the chapter 4.3.2.2 of the 3GPP protocol TS23.502.

The same PDU session may support different TSN domains, for example, support TSN domains 1/2/3. In event that the last TSN domain is deleted, the PDU session needs to be deleted, and the UE initiates a PDU session release process in this case; and in event that one of the TSN domains is deleted, and other TSN domains still exist, the UE initiates a PDU session modification process in this case.

In an embodiment of this application, after a PDU session is released, the SMF entity releases functions of the UPF entity and the NW-TT that are related to the PDU session. That is, the UPF entity/NW-TT stops forwarding TSN synchronization data of all TSN domains to the UE.

In an embodiment of this application, the UE adds a new parameter to the initiated PDU session modification message (N1 SM container (PDU session modification request (deactivation of TSN domain ID))), namely, an ID of a TSN domain that needs to be deactivated. After receiving the ID of the TSN domain that needs to be deactivated, the SMF entity instructs the UPF entity/NW-TT to stop forwarding TSN synchronization data of the TSN domain to the UE.

Figure 9:
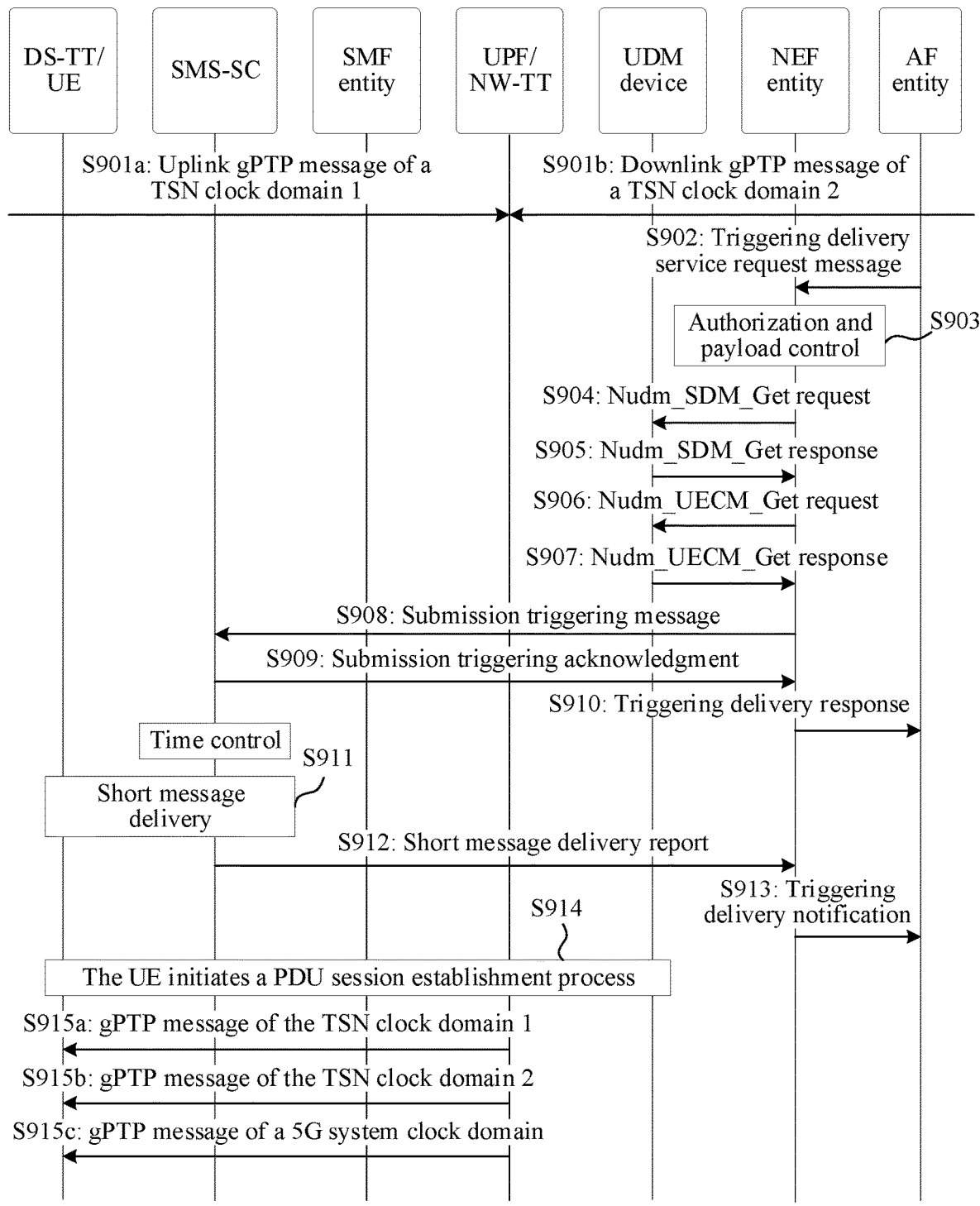
FIG. 9 is a flowchart of performing a TSN time synchronization activation operation under control of a short message service-service center (SMS-SC) according to an embodiment of this application.

2. An embodiment in which the SMS-SC controls the moment performing the TSN time synchronization operation (divided into an activation process and a deactivation process):

FIG. 9 shows a process of performing a TSN time synchronization activation operation under control of an SMS-SC according to an embodiment of this application, and the process includes the following steps:

Step S901a: A grand master clock of a TSN domain 1 transmits an uplink gPTP message of the TSN clock domain 1 to a UPF entity/NW-TT through a UE (the UE is not the DS-TT/UE shown in FIG. 9); Step S901b: A grand master clock of a TSN domain 2 transmits a downlink gPTP message of the TSN clock domain 2 to the UPF entity/NW-TT through a terminal device (for example, another UE). Messages of step S901a and step S901b are respectively used for performing TSN time synchronization operations of different TSN time domains.

Step S902: An AF entity transmits a triggering delivery service request message to a NEF entity.

In an embodiment of this application, for a specific process of step S902, reference may be made to step 2 in the procedure of "Application Triggering" service in the chapter 4.13.2.2 of the 3GPP protocol TS23.502. However, the triggering delivery service request message in this embodiment of this application includes a target ID, user equipment trigger time information, and a TSN trigger container. The user equipment trigger time information is used for instructing to trigger a UE to perform a TSN time synchronization operation immediately, or trigger a UE to perform a TSN time synchronization operation after X seconds, or trigger a UE to perform a TSN time synchronization operation at a specified time point. In response to determining, according to the configuration of the carrier network, to use the SMS-SC to control a trigger time of the user equipment, when transmitting a submission triggering message to the SMS-SC, the NET entity sets an SMS delivery time in the submission triggering message and sets a value thereof as the received user equipment trigger time information. The SMS delivery time is used for instructing the SMS-SC to transmit a short message immediately, or transmit a short message after X seconds of the message, or transmit a short message at a specified time point. After receiving the triggering message, the UE immediately performs the TSN time synchronization operation, thereby implementing a TSN time synchronization operation at a specified time.

The target ID refers to a specific UE or a group of UEs. In event that the target ID refers to a specific UE, the target ID is generally a SUPI, an IMSI, a GPSI, or another external application identifier. In event that the target ID refers to a group of UEs, the target ID is generally an external group ID.

The TSN trigger container may include the following parameters: a TSN domain ID, UL or DL TSN synchronization, an activation/deactivation indicator, S-NSSAI, and a DNN. The embodiment shown in FIG. 9 is a TSN time synchronization activation operation, so that a value of the activation/deactivation indicator is activation.

Step S903: The NEF entity performs authorization and payload control processing. A processing process of this step is similar to step S703 shown in FIG. 7, and details are not described herein again.

Step S904: The NEF entity transmits a Nudm_SDM_Get request to a UDM device. A processing process of this step is similar to step S704 shown in FIG. 7, and details are not described herein again.

Step S905: The UDM device transmits a Nudm_SDM_Get response to the NEF entity. A processing process of this step is similar to step S705 shown in FIG. 7, and details are not described herein again.

Similar to the foregoing description, the target ID may refer to a group of UEs. In event that the target ID refers to a group of UEs, the target ID is generally an external group ID, and a reply of step S905 is a SUPI list and an MSISDN list optionally. In this case, subsequent step S906 to step S915 may perform a similar operation to each SUPI (namely, each UE) in the list.

Step S906: The NEF entity transmits a Nudm_UECM_Get request to the UDM device. A processing process of this step is similar to step S706 shown in FIG. 7, and details are not described herein again.

Step S907: The UDM device transmits a Nudm_UECM_Get response to the NEF entity. A processing process of this step is similar to step S707 shown in FIG. 7, and details are not described herein again.

Step S908: The NEF entity transmits a submission triggering message to an SMS-SC, the submission triggering message including the foregoing SMS delivery time. A processing process of this step is similar to step S708 shown in FIG. 7, and details are not described herein again.

Step S909: The SMS-SC returns a submission triggering acknowledgment message to the NEF entity, to acknowledge that the SMS-SC receives the submission triggering message of the NEF entity.

Step S910: The NEF entity transmits a triggering delivery response to the AF entity to acknowledge that the triggering delivery service request message of the AF entity is received.

Step S911: The SMS-SC transmits a short message to a UE (target UE).

In an embodiment of this application, in event that the SMS delivery time in the submission triggering message received by the SMS-SC in step S908 instructs to transmit immediately (in event that the parameter of SMS delivery time is not included, it also instructs to transmit immediately), step S911 is performed immediately; in event that the SMS delivery time instructs to transmit after X seconds, step S911 is performed after X seconds of receiving the submission triggering message in step S908; and in event that the SMS delivery time instructs to transmit at a specified time point, step S911 is performed in event that the specified time point is reached. A process that the SMS-SC transmits a short message to the target UE in this step is similar to step S711 shown in FIG. 7, and details are not described herein again.

Step S912: The SMS-SC transmits a short message delivery report to the NEF entity.

Step S913: The NEF entity transmits a triggering delivery notification to the AF entity.

In addition to the foregoing points that need to be particularly noted, for a specific process of step S902 to step S913, reference may be made to step 2 to step 13 in the procedure of "Application Triggering" service in the chapter 4.13.2.2 of the 3GPP protocol TS23.502.

Step S914: The UE initiates a PDU session establishment process. A processing process of this step is similar to step S715 shown in FIG. 7, and details are not described herein again.

Step S915a: The UPF entity/NW-TT transmits the gPTP message of the TSN clock domain 1 to the UE; Step S915b: The UPF entity/NW-TT transmits the gPTP message of the TSN clock domain 2 to the UE; and in event that the TSN domain ID indicates a 5G time domain, step S915c: The UPF entity/NW-TT transmits a gPTP message of a 5G system clock domain to the UE.

In an embodiment of this application, for step S915a to step S915c, reference may be made to 3GPP protocol TR23.700-020. In this case, the UPF entity/NW-TT forwards data related to TSN synchronization in different directions according to the TSN domain, to help the UE perform TSN time synchronization processing.

Figure 10:
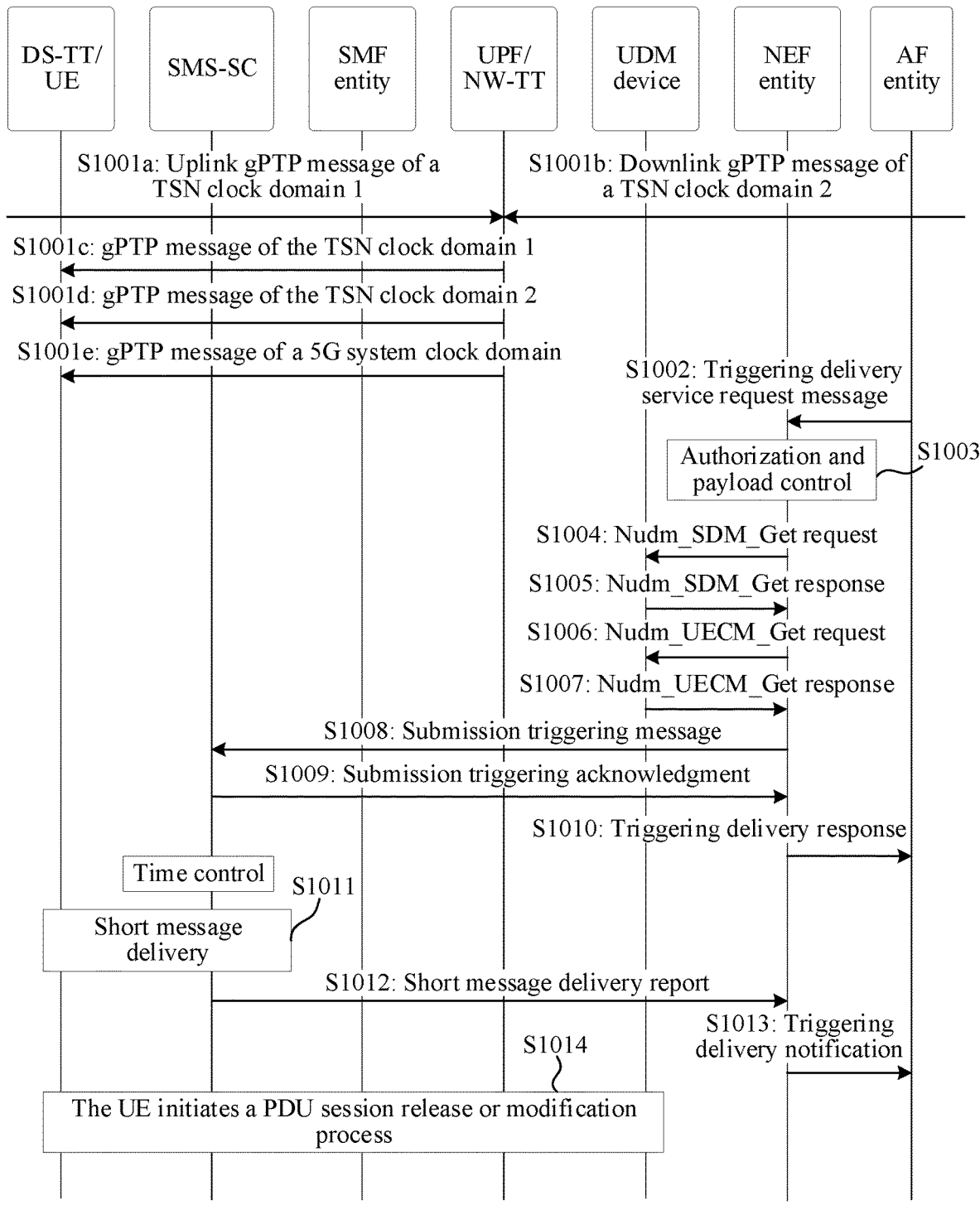
FIG. 10 is a flowchart of performing a TSN time synchronization deactivation operation under control of an SMS-SC according to an embodiment of this application.

FIG. 10 shows a process of performing a TSN time synchronization deactivation operation under control of an SMS-SC according to an embodiment of this application, and the process includes the following steps:

Step S1001a: A grand master clock of a TSN domain 1 transmits an uplink gPTP message of the TSN clock domain 1 to a UPF entity/NW-TT through a UE (the UE is not the DS-TT/UE shown in FIG. 10); Step S1001b: A grand master clock of a TSN domain 2 transmits a downlink gPTP message of the TSN clock domain 2 to the UPF entity/NW-TT through a terminal device (for example, another UE). Step S1001c: The UPF entity/NW-TT transmits the gPTP message of the TSN clock domain 1 to the UE; Step S1001d: The UPF entity/NW-TT transmits the gPTP message of the TSN clock domain 2 to the UE; and Step S1001e: In event that 5G time domain synchronization is performed, the UPF entity/NW-TT transmits a gPTP message of a 5G system clock domain to the UE. Messages of step S1001a to step S1001e are respectively used for performing TSN time synchronization operations of different TSN time domains by the UE.

Step S1002: An AF entity transmits a triggering delivery service request message to a NEF entity.

In an embodiment of this application, a process that the AF entity transmits the triggering delivery service request message is similar to step S902 shown in FIG. 9, but the embodiment shown in FIG. 10 is a TSN time synchronization deactivation operation, so that a value of the activation/deactivation indicator is deactivation.

Step S1003: The NEF entity performs authorization and payload control processing. A processing process of this step is similar to step S703 shown in FIG. 7, and details are not described herein again.

Step S1004: The NEF entity transmits a Nudm_SDM_Get request to a UDM device. A processing process of this step is similar to step S704 shown in FIG. 7, and details are not described herein again.

Step S1005: The UDM device transmits a Nudm_SDM_Get response to the NEF entity. A processing process of this step is similar to step S705 shown in FIG. 7, and details are not described herein again.

Similar to the foregoing description, the target ID may refer to a group of UEs. In event that the target ID refers to a group of UEs, the target ID is generally an external group ID, and a reply of step S1005 is a SUPI list and an MSISDN list optionally. In this case, subsequent step S1006 to step S1014 may perform a similar operation to each SUPI (namely, each UE) in the list.

Step S1006: The NEF entity transmits a Nudm_UECM_Get request to the UDM device. A processing process of this step is similar to step S706 shown in FIG. 7, and details are not described herein again.

Step S1007: The UDM device transmits a Nudm_UECM_Get response to the NEF entity. A processing process of this step is similar to step S707 shown in FIG. 7, and details are not described herein again.

Step S1008: The NEF entity transmits a submission triggering message to an SMS-SC. The submission triggering message includes an SMS delivery time. For setting of the SMS delivery time, reference may be made to the description of step S902 in FIG. 9, and details are not described herein again. A processing process of this step is similar to step S708 shown in FIG. 7, and details are not described herein again.

Step S1009: The SMS-SC returns a submission triggering acknowledgment message to the NEF entity, to acknowledge that the SMS-SC receives the submission triggering message of the NEF entity.

Step S1010: The NEF entity transmits a triggering delivery response to the AF entity to acknowledge that the triggering delivery service request message of the AF entity is received.

Step S1011: The SMS-SC transmits a short message to a target UE.

In an embodiment of this application, in event that the SMS delivery time in the submission triggering message received by the SMS-SC in step S1008 instructs to transmit immediately (in event that the parameter of SMS delivery time is not included, it also instructs to transmit immediately), step S1011 is performed immediately; in event that the SMS delivery time instructs to transmit after X seconds, step S1011 is performed after X seconds of receiving the submission triggering message in step S1008; and in event that the SMS delivery time instructs to transmit at a specified time point, step S1011 is performed in event that the specified time point is reached. A processing process of this step is similar to step S711 shown in FIG. 7, and details are not described herein again.

Step S1012: The SMS-SC transmits a short message delivery report to the NEF entity.

Step S1013: The NEF entity transmits a triggering delivery notification to the AF entity.

In addition to the foregoing points that need to be particularly noted, for a specific process of step S1002 to step S1013, reference may be made to step 2 to step 13 in the procedure of "Application Triggering" service in the chapter 4.13.2.2 of the 3GPP protocol TS23.502.

Step S1014: The UE initiates a PDU session release process or a PDU session modification process.

In an embodiment of this application, for a PDU session release process initiated by the UE, reference may be made to the chapter 4.3.4.2 of the 3GPP protocol TS23.502; and for a PDU session modification process initiated by the UE, reference may be made to a chapter 4.3.2.2 of the 3GPP protocol TS23.502.

The same PDU session may support different TSN domains, for example, support TSN domains 1/2/3. In event that the last TSN domain is deleted, the PDU session needs to be deleted, and the UE initiates a PDU session release process in this case; and in event that one of the TSN domains is deleted, and other TSN domains still exist, the UE initiates a PDU session modification process in this case.

In an embodiment of this application, after a PDU session is released, the SMF entity releases functions of the UPF entity and the NW-TT that are related to the PDU session. That is, the UPF entity/NW-TT stops forwarding TSN synchronization data of all TSN domains to the UE.

In an embodiment of this application, the UE adds a new parameter to the initiated PDU session modification message (N1 SM container (PDU session modification request (deactivation of TSN domain ID))), namely, an ID of a TSN domain that needs to be deactivated. After receiving the ID of the TSN domain that needs to be deactivated, the SMF entity instructs the UPF entity/NW-TT to stop forwarding TSN synchronization data of the TSN domain to the UE.

In a PDU session deletion or a PDU session modification process, the SMF entity registers to the UDM device and notifies to delete the TSN domain ID corresponding to the S-NSSAI and the DNN, so that the UDM device knows that a process that the UE performs TSN deactivation has been successfully triggered by comparing the S-NSSAI, the DNN, and the TSN domain ID.

Figure 11:
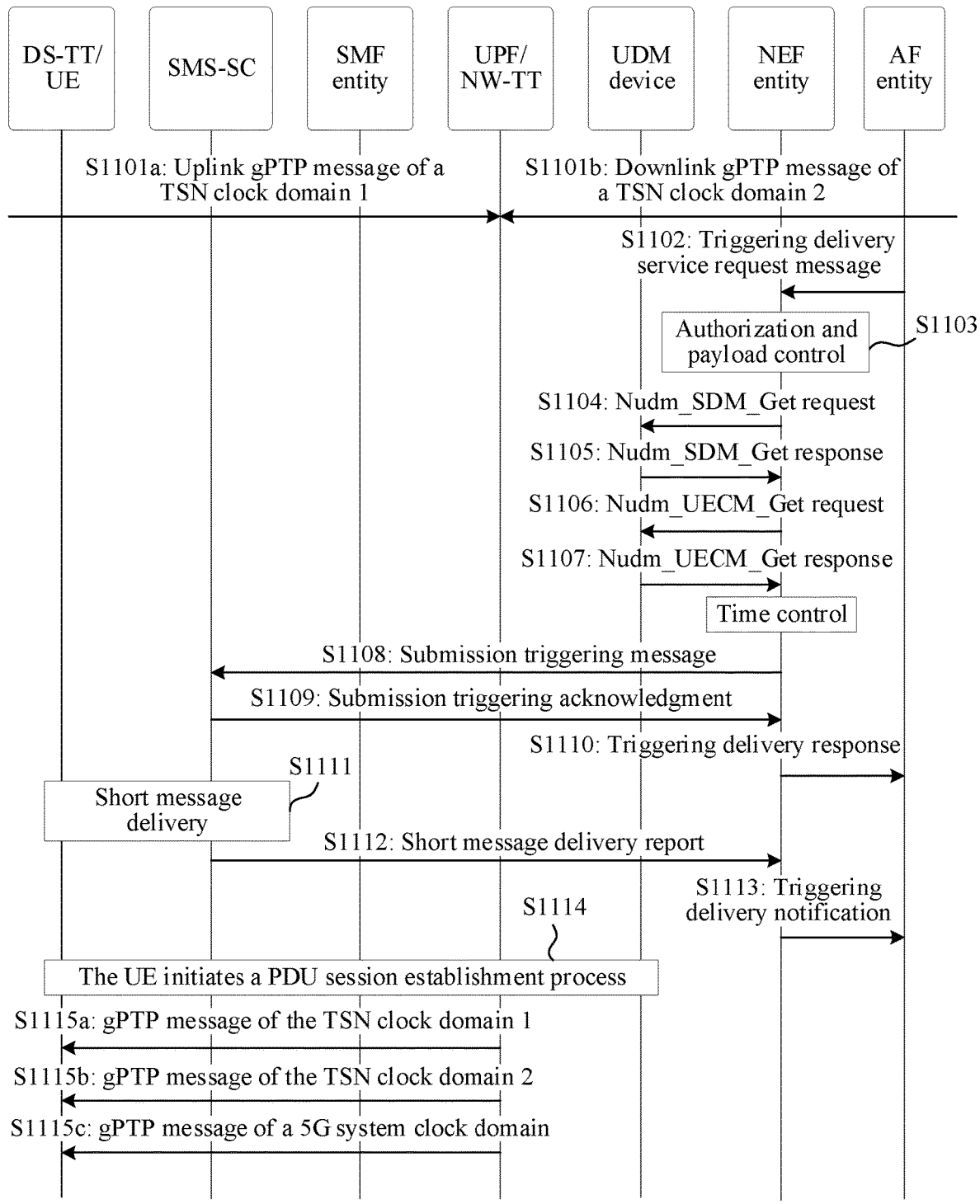
FIG. 11 is a flowchart of performing a TSN time synchronization activation operation under control of a network exposure function (NEF) entity according to an embodiment of this application.

3. An embodiment in which the NEF entity controls the moment performing the TSN time synchronization operation (divided into an activation process and a deactivation process):

FIG. 11 shows a process of performing a TSN time synchronization activation operation under control of a NEF entity according to an embodiment of this application, and the process includes the following steps:

Step S1101a: A grand master clock of a TSN domain 1 transmits an uplink gPTP message of the TSN clock domain 1 to a UPF entity/NW-TT through a UE (the UE is not the DS-TT/UE shown in FIG. 11); and Step S1101b: A grand master clock of a TSN domain 2 transmits a downlink gPTP message of the TSN clock domain 2 to the UPF entity/NW-TT through a terminal device (for example, another UE). Messages of step S1101a and step S1101b are respectively used for performing TSN time synchronization operations of different TSN time domains.

Step S1102: An AF entity transmits a triggering delivery service request message to a NEF entity.

In an embodiment of this application, for a specific process of step S1102, reference may be made to step 2 in the procedure of "Application Triggering" service in the chapter 4.13.2.2 of the 3GPP protocol TS23.502. However, the triggering delivery service request message in this embodiment of this application includes a target ID, user equipment trigger time information, and a TSN trigger container. The user equipment trigger time information is used for instructing to trigger a UE to perform a TSN time synchronization operation immediately, or trigger a UE to perform a TSN time synchronization operation after X seconds, or trigger a UE to perform a TSN time synchronization operation at a specified time point. In response to determining, according to the configuration of the carrier network, to use the NEF entity to control the trigger time of the user equipment, the NEF entity determines, according to the user equipment trigger time information, whether to transmit a submission triggering message to the SMS-SC immediately, transmit a submission triggering message to the SMS-SC after X seconds, or transmit a submission triggering message to the SMS-SC at a specified time point.

The target ID refers to a specific UE or a group of UEs. In event that the target ID refers to a specific UE, the target ID is generally a SUPI, an IMSI, a GPSI, or another external application identifier. In event that the target ID refers to a group of UEs, the target ID is generally an external group ID. The TSN trigger container includes the following parameters: a TSN domain ID, UL or DL TSN synchronization, an activation/deactivation indicator, S-NSSAI, and a DNN.

Step S1103: The NEF entity performs authorization and payload control processing. A processing process of this step is similar to step S703 shown in FIG. 7, and details are not described herein again.

Step S1104: The NEF entity transmits a Nudm_SDM_Get request to a UDM device. A processing process of this step is similar to step S704 shown in FIG. 7, and details are not described herein again.

Step S1105: The UDM device transmits a Nudm_SDM_Get response to the NEF entity. A processing process of this step is similar to step S705 shown in FIG. 7, and details are not described herein again.

Similar to the foregoing description, the target ID may refer to a group of UEs. In event that the target ID refers to a group of UEs, the target ID is generally an external group ID, and a reply of step S1105 is a SUPI list and an MSISDN list optionally. In this case, subsequent step S1106 to step S1115 may perform a similar operation to each SUPI (namely, each UE) in the list.

Step S1106: The NEF entity transmits a Nudm_UECM_Get request to the UDM device. A processing process of this step is similar to step S706 shown in FIG. 7, and details are not described herein again.

Step S1107: The UDM device transmits a Nudm_UECM_Get response to the NEF entity. A processing process of this step is similar to step S707 shown in FIG. 7, and details are not described herein again.

Step S1108: The NEF entity transmits a submission triggering message to an SMS-SC.

In an embodiment of this application, in event that user equipment trigger time information in the triggering delivery service request message received by the NEF entity in step S1102 instructs to perform a user equipment trigger operation immediately, step S1108 is performed immediately; in event that user equipment trigger time information in the triggering delivery service request message received by the NEF entity in step S1102 instructs to perform a user equipment trigger operation after X seconds, step S1108 is performed after X seconds of receiving the triggering delivery service request message in step S1102; and in event that user equipment trigger time information in the triggering delivery service request message received by the NEF entity in step S1102 instructs to perform a user equipment trigger operation at a specified time point, step S1108 is performed in event that the specified time point is reached. A processing process of this step is similar to step S708 shown in FIG. 7, and details are not described herein again.

Step S1109: The SMS-SC returns a submission triggering acknowledgment message to the NEF entity, to acknowledge that the SMS-SC receives the message of the NEF entity.

Step S1110: The NEF entity transmits a triggering delivery response to the AF entity to acknowledge that the triggering delivery service request message of the AF entity is received.

Step S1111: The SMS-SC transmits a short message to a target UE. A processing process of this step is similar to step S711 shown in FIG. 7, and details are not described herein again.

Step S1112: The SMS-SC transmits a short message delivery report to the NEF entity.

Step S1113: The NEF entity transmits a triggering delivery notification to the AF entity.

In addition to the foregoing points that need to be particularly noted, for a specific process of step S1102 to step S1113, reference may be made to step 2 to step 13 in the procedure of "Application Triggering" service in the chapter 4.13.2.2 of the 3GPP protocol TS23.502.

Step S1114: The UE initiates a PDU session establishment process. A processing process of this step is similar to step S715 shown in FIG. 7, and details are not described herein again.

Step S1115a: The UPF entity/NW-TT transmits the gPTP message of the TSN clock domain 1 to the UE; Step S1115b: The UPF entity/NW-TT transmits the gPTP message of the TSN clock domain 2 to the UE; and in event that the TSN domain ID indicates a 5G time domain, step S1115c: The UPF entity/NW-TT transmits a gPTP message of a 5G system clock domain to the UE.

In an embodiment of this application, for step S1115a to step S1115c, reference may be made to 3GPP protocol TR23.700-020. In this case, the UPF entity/NW-TT forwards data related to TSN synchronization in different directions according to the TSN domain, to help the UE perform TSN time synchronization processing.

Figure 12:
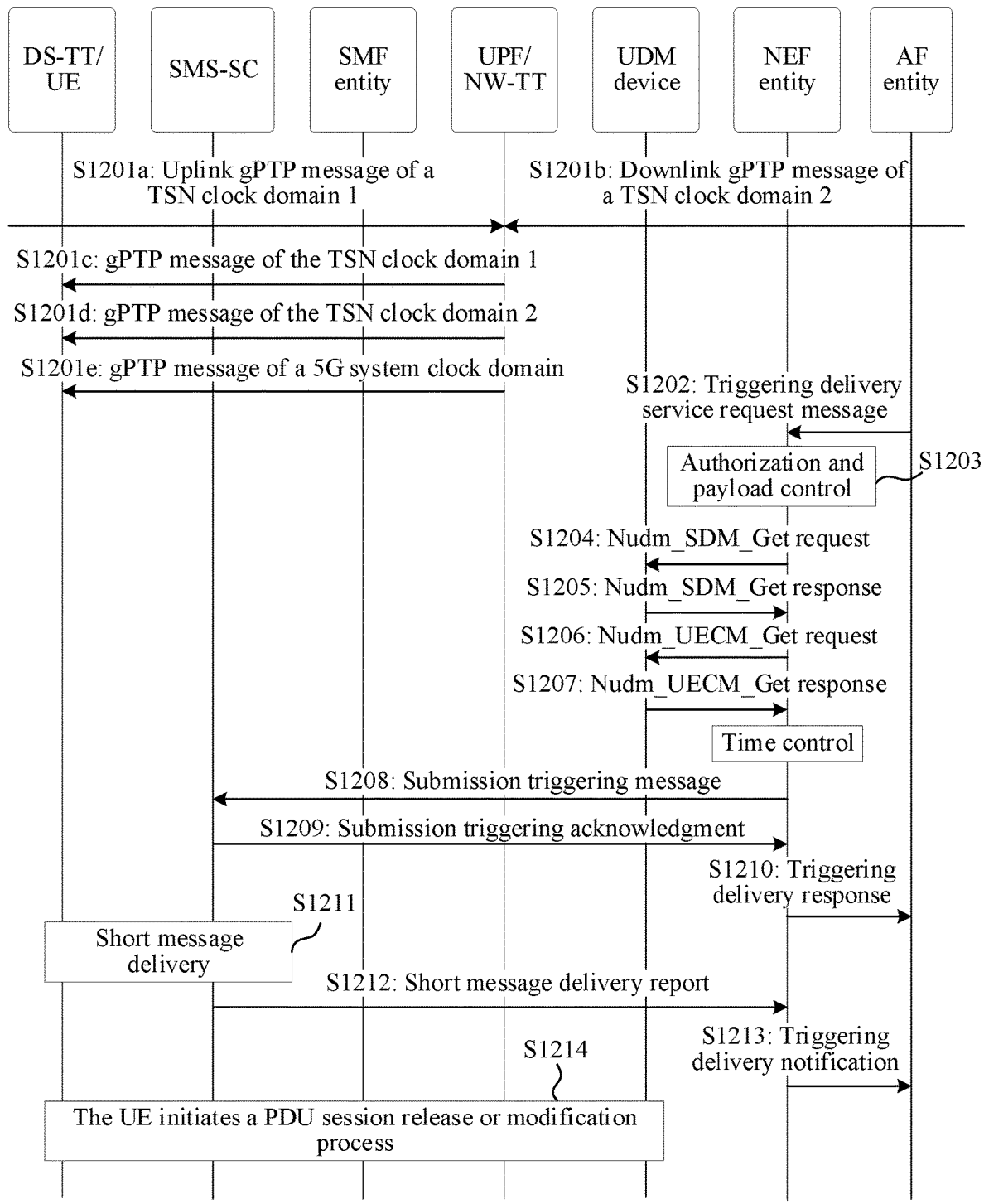
FIG. 12 is a flowchart of performing a TSN time synchronization deactivation operation under control of a NEF entity according to an embodiment of this application.

FIG. 12 shows a process of performing a TSN time synchronization deactivation operation under control of a NEF entity according to an embodiment of this application, and the process includes the following steps:

Step S1201a: A grand master clock of a TSN domain 1 transmits an uplink gPTP message of the TSN clock domain 1 to a UPF entity/NW-TT through a UE (the UE is not the DS-TT/UE shown in FIG. 12); Step S1201b: A grand master clock of a TSN domain 2 transmits a downlink gPTP message of the TSN clock domain 2 to the UPF entity/NW-TT through a terminal device (for example, another UE); Step S1201c: The UPF entity/NW-TT transmits the gPTP message of the TSN clock domain 1 to the UE; Step S1201d: The UPF entity/NW-TT transmits the gPTP message of the TSN clock domain 2 to the UE; and Step S1201e: In event that 5G time domain synchronization is performed, the UPF entity/NW-TT transmits a gPTP message of a 5G system clock domain to the UE. Messages of step S1201a to step S1201e are respectively used for performing TSN time synchronization operations of different TSN time domains by the UE.

Step S1202: An AF entity transmits a triggering delivery service request message to a NEF entity.

In an embodiment of this application, a process that the AF entity transmits the triggering delivery service request message is similar to step S1102 shown in FIG. 11, but the embodiment shown in FIG. 12 is a TSN time synchronization deactivation operation, so that a value of the activation/deactivation indicator is deactivation.

Step S1203: The NEF entity performs authorization and payload control processing. A processing process of this step is similar to step S703 shown in FIG. 7, and details are not described herein again.

Step S1204: The NEF entity transmits a Nudm_SDM_Get request to a UDM device. A processing process of this step is similar to step S704 shown in FIG. 7, and details are not described herein again.

Step S1205: The UDM device transmits a Nudm_SDM_Get response to the NEF entity. A processing process of this step is similar to step S705 shown in FIG. 7, and details are not described herein again.

Similar to the foregoing description, the target ID may refer to a group of UEs. In event that the target ID refers to a group of UEs, the target ID is generally an external group ID, and a reply of step S1205 is a SUPI list and an MSISDN list optionally. In this case, subsequent step S1206 to step S1214 may perform a similar operation to each SUPI (namely, each UE) in the list.

Step S1206: The NEF entity transmits a Nudm_UECM_Get request to the UDM device. A processing process of this step is similar to step S706 shown in FIG. 7, and details are not described herein again.

Step S1207: The UDM device transmits a Nudm_UECM_Get response to the NEF entity. A processing process of this step is similar to step S707 shown in FIG. 7, and details are not described herein again.

Step S1208: The NEF entity transmits a submission triggering message to an SMS-SC.

In an embodiment of this application, in event that user equipment trigger time information in the triggering delivery service request message received by the NEF entity in step S1202 instructs to perform a user equipment trigger operation immediately, step S1208 is performed immediately; in event that user equipment trigger time information in the triggering delivery service request message received by the NEF entity in step S1202 instructs to perform a user equipment trigger operation after X seconds, step S1208 is performed after X seconds of receiving the triggering delivery service request message in step S1202; and in event that user equipment trigger time information in the triggering delivery service request message received by the NEF entity in step S1202 instructs to perform a user equipment trigger operation at a specified time point, step S1208 is performed in event that the specified time point is reached. A processing process of this step is similar to step S708 shown in FIG. 7, and details are not described herein again.

Step S1209: The SMS-SC returns a submission triggering acknowledgment message to the NEF entity, to acknowledge that the SMS-SC receives the message of the NEF entity.

Step S1210: The NEF entity transmits a triggering delivery response to the AF entity to acknowledge that the triggering delivery service request message of the AF entity is received.

Step S1211: The SMS-SC transmits a short message to a target UE. A processing process of this step is similar to step S711 shown in FIG. 7, and details are not described herein again.

Step S1212: The SMS-SC transmits a short message delivery report to the NEF entity.

Step S1213: The NEF entity transmits a triggering delivery notification to the AF entity.

In addition to the foregoing points that need to be particularly noted, for a specific process of step S1202 to step S1213, reference may be made to step 2 to step 13 in the procedure of "Application Triggering" service in the chapter 4.13.2.2 of the 3GPP protocol TS23.502.

Step S1214: The UE initiates a PDU session release process or a PDU session modification process.

In an embodiment of this application, for a PDU session release process initiated by the UE, reference may be made to the chapter 4.3.4.2 of the 3GPP protocol TS23.502; and for a PDU session modification process initiated by the UE, reference may be made to a chapter 4.3.2.2 of the 3GPP protocol TS23.502.

The same PDU session may support different TSN domains, for example, support TSN domains 1/2/3. In event that the last TSN domain is deleted, the PDU session needs to be deleted, and the UE initiates a PDU session release process in this case; and in event that one of the TSN domains is deleted, and other TSN domains still exist, the UE initiates a PDU session modification process in this case.

In an embodiment of this application, after a PDU session is released, the SMF entity releases functions of the UPF entity and the NW-TT that are related to the PDU session. That is, the UPF entity/NW-TT stops forwarding TSN synchronization data of all TSN domains to the UE.

In an embodiment of this application, the UE adds a new parameter to the initiated PDU session modification message (N1 SM container (PDU session modification request (deactivation of TSN domain ID))), namely, an ID of a TSN domain that needs to be deactivated. After receiving the ID of the TSN domain that needs to be deactivated, the SMF entity instructs the UPF entity/NW-TT to stop forwarding TSN synchronization data of the TSN domain to the UE.

In a PDU session deletion or a PDU session modification process, the SMF entity registers to the UDM device and notifies to delete the TSN domain ID corresponding to the S-NSSAI and the DNN, so that the UDM device knows that a process that the UE performs TSN deactivation has been successfully triggered by comparing the S-NSSAI, the DNN, and the TSN domain ID.

The technical solutions of the foregoing embodiments of this application can perform effective control over time synchronization operations (include TSN synchronization activation and deactivation) of one user equipment or a group of user equipments, and can support uplink and downlink TSN time synchronization and 5G network time domain synchronization. TSC communication is applied to the real-time industrial production field, so that the technical solutions of the embodiments of this application include a great market value.

The following describes apparatus embodiments of this application, which may be used for performing the time synchronization methods in the foregoing embodiments of this application. For details not disclosed in the apparatus embodiments of this application, reference may be made to the foregoing time synchronization method embodiments of this application.

Figure 13:
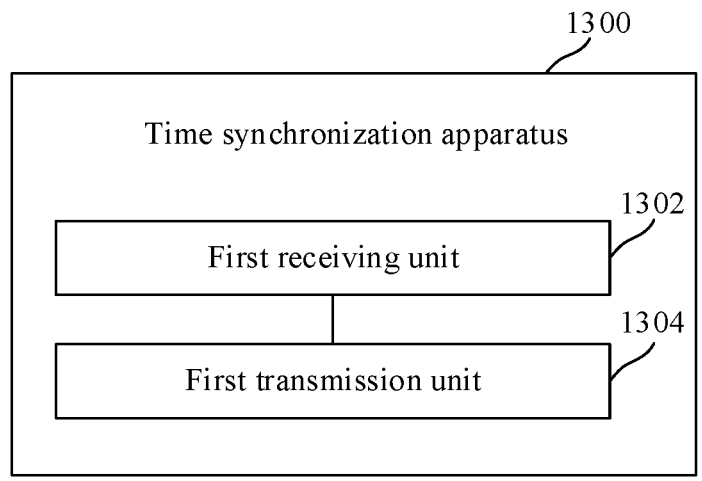
FIG. 13 is a block diagram of a time synchronization apparatus according to an embodiment of this application.

FIG. 13 is a block diagram of a time synchronization apparatus according to an embodiment of this application. The time synchronization apparatus may be disposed in a network exposure function (NEF) entity.

Referring to FIG. 13, a time synchronization apparatus 1300 according to an embodiment of this application includes: a first receiving unit 1302 and a first transmission unit 1304.

The first receiving unit 1302 is configured to receive a triggering delivery service request message transmitted by an application function (AF) entity, the triggering delivery service request message including an identifier of a target user equipment and a time sensitive network (TSN) trigger container, the TSN trigger container being used for indicating a TSN time synchronization trigger condition; and The first transmission unit 1304 is configured to transmit a submission triggering message to a short message service-service center (SMS-SC), the submission triggering message being used for requesting the SMS-SC to transmit a short message including the TSN trigger container to the target user equipment, to enable the target user equipment to perform a TSN time synchronization operation based on the TSN trigger container.

In some embodiments of this application, based on the foregoing solutions, the first transmission unit 1304 is further configured to convert the identifier of the target user equipment from an external identifier into a network identifier, where in event that the identifier of the target user equipment includes an external identifier of a single user equipment, the external identifier of the single user equipment is converted into a network identifier of the single user equipment; and in event that the identifier of the target user equipment includes an external group identifier corresponding to a plurality of user equipments, the external group identifier is converted into a network identifier list of the plurality of user equipments.

In an embodiment of this application, based on the foregoing solutions, in event that the identifier of the target user equipment includes an external group identifier corresponding to a plurality of user equipments, the first transmission unit 1304 is configured to transmit a submission triggering message to the SMS-SC for each user equipment in the network identifier list.

In some embodiments of this application, based on the foregoing solutions, the first transmission unit 1304 is configured to: in response to determining, according to a configuration of a carrier network, that the NEF entity controls a moment at which the target user equipment performs the TSN time synchronization operation, and in event that user equipment trigger time information included in the triggering delivery service request message instructs to perform a user equipment trigger operation immediately or the triggering delivery service request message does not include user equipment trigger time information, transmit the submission triggering message to the SMS-SC immediately; in event that user equipment trigger time information included in the triggering delivery service request message instructs to perform a user equipment trigger operation after a predetermined time, transmit the submission triggering message to the SMS-SC after the predetermined time of receiving the triggering delivery service request message; in event that user equipment trigger time information included in the triggering delivery service request message instructs to perform a user equipment trigger operation at a specified time point, transmit the submission triggering message to the SMS-SC in response to a current time reaching the specified time point; and in event that user equipment trigger time information included in the triggering delivery service request message instructs to perform a user equipment trigger operation at a specified time point, but a current time exceeds the specified time point, transmit the submission triggering message to the SMS-SC immediately.

In some embodiments of this application, based on the foregoing solutions, the first transmission unit 1304 is configured to: in response to determining, according to the configuration of the carrier network, that the SMS-SC controls the moment at which the target user equipment performs the TSN time synchronization operation, transmit a submission triggering message including short message delivery time information to the SMS-SC, the short message delivery time information being from user equipment trigger time information in the triggering delivery service request message; or transmit a submission triggering message including TSN activation time information to the SMS-SC, the TSN activation time information being set in the TSN trigger container.

In some embodiments of this application, based on the foregoing solutions, in event that the TSN trigger container includes the TSN activation time information, the TSN activation time information is used for instructing the target user equipment to perform the TSN time synchronization operation immediately after receiving the short message, or instructing the target user equipment to perform the TSN time synchronization operation after a predetermined time of receiving the short message, or instructing the target user equipment to perform the TSN time synchronization operation at a specified time point; and in event that the TSN trigger container does not include the TSN activation time information, the TSN trigger container is used for instructing the target user equipment to perform the TSN time synchronization operation immediately after receiving the short message.

In some embodiments of this application, based on the foregoing solutions, in event that the submission triggering message includes the short message delivery time information, the short message delivery time information is used for instructing the SMS-SC to transmit the short message immediately after receiving the submission triggering message, or instructing the SMS-SC to transmit the short message after a predetermined time of receiving the submission triggering message, or instructing the SMS-SC to transmit the short message at a specified time point, the short message delivery time information being from the user equipment trigger time information in the triggering delivery service request message; and in event that the submission triggering message does not include the short message delivery time information, the submission triggering message is used for instructing the SMS-SC to transmit the short message immediately after receiving the submission triggering message.

In some embodiments of this application, based on the foregoing solutions, the TSN trigger container includes the following information: a TSN clock domain identifier, first field information used for indicating uplink TSN synchronization or downlink TSN synchronization, second field information used for indicating an activation operation or a deactivation operation, network slice information, and a data network name.

Figure 14:
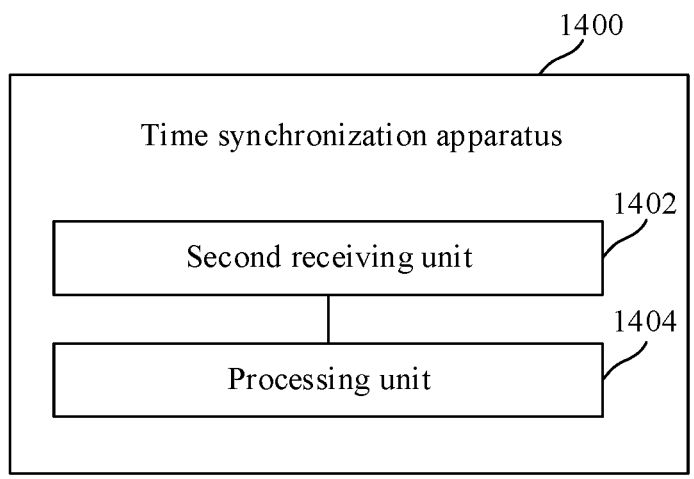
FIG. 14 is a block diagram of a time synchronization apparatus according to an embodiment of this application.

FIG. 14 is a block diagram of a time synchronization apparatus according to an embodiment of this application. The time synchronization apparatus may be disposed in a user equipment (UE).

Referring to FIG. 14, a time synchronization apparatus 1400 according to an embodiment of this application includes: a second receiving unit 1402 and a processing unit 1404.

The second receiving unit 1402 is configured to receive a short message transmitted by a short message service-service center (SMS-SC), the short message including a time sensitive network (TSN) trigger container, the TSN trigger container being used for indicating a TSN time synchronization trigger condition; and the processing unit 1404 is configured to perform a TSN time synchronization operation based on information included in the TSN trigger container.

In some embodiments of this application, based on the foregoing solutions, the TSN trigger container includes second field information used for indicating an activation operation or a deactivation operation; and the processing unit 1404 is configured to: in event that the second field information indicates an activation operation, and TSN activation time information included in the TSN trigger container instructs a user equipment to perform the TSN time synchronization operation immediately after receiving the short message, establish a protocol data unit (PDU) session to perform the TSN time synchronization operation immediately; in event that the second field information indicates an activation operation, and TSN activation time information included in the TSN trigger container instructs a user equipment to perform the TSN time synchronization operation after a predetermined time of receiving the short message, establish a PDU session to perform the TSN time synchronization operation after the predetermined time of receiving the short message; in event that the second field information indicates an activation operation, and TSN activation time information included in the TSN trigger container instructs a user equipment to perform the TSN time synchronization operation at a specified time point, establish a PDU session to perform the TSN time synchronization operation in event that a current time reaches the specified time point; in event that the second field information indicates an activation operation, and TSN activation time information included in the TSN trigger container instructs a user equipment to perform the TSN time synchronization operation at a specified time point, but a current time exceeds the specified time point, establish a PDU session to perform the TSN time synchronization operation immediately; and in event that the TSN trigger container does not include TSN activation time information, and the second field information indicates an activation operation, establish a PDU session to perform the TSN time synchronization operation immediately.

In some embodiments of this application, based on the foregoing solutions, the processing unit 1404 establishing a PDU session to perform the TSN time synchronization operation after the predetermined time of receiving the short message includes: detecting whether the user equipment is in an idle state after the predetermined time of receiving the short message; in response to detecting that the user equipment is in an idle state, performing a service request process, and after a signaling connection is established with an AMF entity, establishing a PDU session to perform the TSN time synchronization operation; and in response to detecting that the user equipment is in a connected state, directly establishing a PDU session to perform the TSN time synchronization operation.

In some embodiments of this application, based on the foregoing solutions, the processing unit 1404 establishing a PDU session to perform the TSN time synchronization operation in response to a current time reaching the specified time point includes: detecting whether the user equipment is in an idle state in response to the current time reaching the specified time point; in response to detecting that the user equipment is in an idle state, performing a service request process, and after a signaling connection is established with an AlVif entity, establishing a PDU session to perform the TSN time synchronization operation; and in response to detecting that the user equipment is in a connected state, directly establishing a PDU session to perform the TSN time synchronization operation.

In some embodiments of this application, based on the foregoing solutions, the following parameters may be included in a PDU session establishment request transmitted during establishment of the PDU session, and the following parameters and values of the parameters are from the TSN trigger container included in the short message: a TSN clock domain identifier, first field information used for indicating uplink TSN synchronization or downlink TSN synchronization, second field information used for indicating an activation operation, network slice information, and a data network name.

In some embodiments of this application, based on the foregoing solutions, the TSN trigger container includes second field information used for indicating an activation operation or a deactivation operation; and the processing unit 1404 is configured to: in event that the second field information indicates a deactivation operation, and TSN activation time information included in the TSN trigger container instructs a user equipment to perform the TSN time synchronization operation immediately after receiving the short message, release a PDU session or initiate a PDU session modification process immediately; in event that the second field information indicates a deactivation operation, and TSN activation time information included in the TSN trigger container instructs a user equipment to perform the TSN time synchronization operation after a predetermined time of receiving the short message, release a PDU session or initiate a PDU session modification process after the predetermined time of receiving the short message; in event that the second field information indicates a deactivation operation, and TSN activation time information included in the TSN trigger container instructs a user equipment to perform the TSN time synchronization operation at a specified time point, release a PDU session or initiate a PDU session modification process in response to a current time reaching the specified time point; in event that the second field information indicates an activation operation, and TSN activation time information included in the TSN trigger container instructs a user equipment to perform the TSN time synchronization operation at a specified time point, but a current time exceeds the specified time point, release a PDU session or initiate a PDU session modification process immediately; and in event that the TSN trigger container does not include TSN activation time information, and the second field information indicates a deactivation operation, release a PDU session or initiate a PDU session modification process immediately.

In some embodiments of this application, based on the foregoing solution, the processing unit 1404 initiating a PDU session modification process includes: generating a PDU session modification request, the PDU session modification request including an identifier of a target TSN clock domain that needs to be deactivated; and transmitting the PDU session modification request to a session management function (SMF) entity, to enable the SMF entity to instruct a user plane function (UPF) entity to stop forwarding TSN time synchronization data of the target TSN clock domain to the user equipment transmitting the PDU session modification request.

In some embodiments of this application, based on the foregoing solutions, a PDU session established by the user equipment supports time synchronization operations of a plurality of TSN clock domains; and the processing unit 1404 is configured to: initiate the PDU session modification process in event that a target TSN clock domain that needs to be deactivated, network slice information, and a data network name included in the TSN trigger container respectively match a TSN clock domain, network slice information, and a data network name of the PDU session established by the target user equipment, and the target TSN clock domain that needs to be deactivated indicated by the TSN trigger container is not the last TSN clock domain in the PDU session; and release the PDU session in event that the target TSN clock domain that needs to be deactivated, the network slice information, and the data network name included in the TSN trigger container respectively match the TSN clock domain, the network slice information, and the data network name of the PDU session established by the target user equipment separately, and the target TSN clock domain that needs to be deactivated indicated by the TSN trigger container is the last TSN clock domain in the PDU session.

In some embodiments of this application, based on the foregoing solutions, the TSN trigger container includes the following information: a TSN clock domain identifier, first field information used for indicating uplink TSN synchronization or downlink TSN synchronization, second field information used for indicating an activation operation or a deactivation operation, network slice information, and a data network name.

Figure 15:
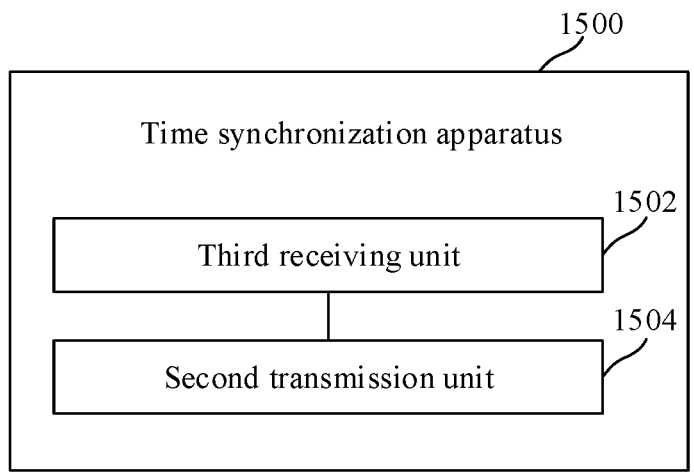
FIG. 15 is a block diagram of a time synchronization apparatus according to an embodiment of this application.

FIG. 15 is a block diagram of a time synchronization apparatus according to an embodiment of this application. The time synchronization apparatus may be disposed in a short message service-service center (SMS-SC).

Referring to FIG. 15, a time synchronization apparatus 1500 according to an embodiment of this application includes: a third receiving unit 1502 and a second transmission unit 1504.

The third receiving unit 1502 is configured to receive a submission triggering message, the submission triggering message being used for requesting to transmit a short message including a time sensitive network (TSN) trigger container to a target user equipment, the TSN trigger container being used for indicating a TSN time synchronization trigger condition; and The second transmission unit 1504 is configured to generate the short message, and transmit the short message to the target user equipment, to enable the target user equipment to perform a TSN time synchronization operation based on the TSN trigger container.

In some embodiments of this application, based on the foregoing solutions, the second transmission unit 1504 is configured to: in event that short message delivery time information included in the submission triggering message instructs to transmit the short message immediately or the submission triggering message does not include short message delivery time information, transmit the short message to the target user equipment immediately; in event that short message delivery time information included in the submission triggering message instructs to transmit the short message after a predetermined time, transmit the short message to the target user equipment after the predetermined time of receiving the submission triggering message; in event that short message delivery time information included in the submission triggering message instructs to transmit the short message at a specified time point, transmit the short message to the target user equipment in event that a current time reaches the specified time point; and in event that short message delivery time information included in the submission triggering message instructs to transmit the short message at a specified time point, but a current time exceeds the specified time point, transmit the short message to the target user equipment immediately.

Figure 16:
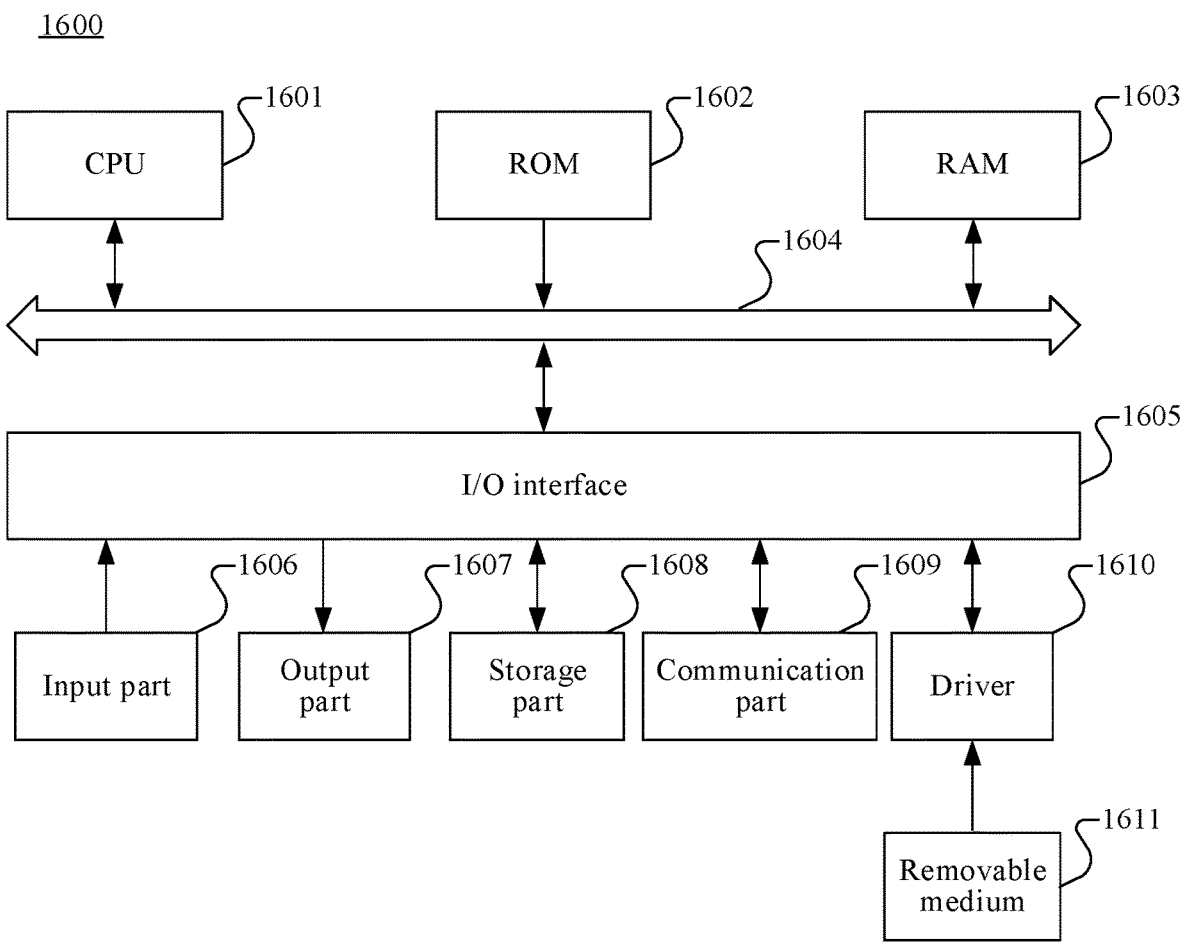
FIG. 16 is a schematic structural diagram of a computer system adapted to implement an electronic device according to an embodiment of this application.

FIG. 16 is a schematic structural diagram of a computer system adapted to implement an electronic device according to an embodiment of this application.

A computer system 1600 of the electronic device shown in FIG. 16 is merely an example, and does not constitute any limitation on functions and use ranges of the embodiments of this application.

As shown in FIG. 16, the computer system 1600 includes a central processing unit (CPU) 1601, which may perform various suitable actions and processing based on a program stored in a read-only memory (ROM) 1602 or a program loaded from a storage part 1608 into a random access memory (RAM) 1603, for example, perform the method described in the foregoing embodiments. The RAM 1603 further stores various programs and data required for system operations. The CPU 1601, the ROM 1602, and the RAM 1603 are connected to each other through a bus 1604. An input/output (I/O) interface 1605 is also connected to the bus 1604.

The following components are connected to the I/O interface 1605: an input part 1606 including a keyboard and a mouse; an output part 1607 including a cathode ray tube (CRT), a liquid crystal display (LCD), and a speaker; a storage part 1608 including a hard disk; and a communication part 1609 including a network interface card such as a local area network (LAN) card or a modem. The communication part 1609 performs communication processing by using a network such as the Internet. A driver 1610 is also connected to the I/O interface 1605 as required. A removable medium 1611, such as a magnetic disk, an optical disc, a magneto-optical disk, or a semiconductor memory, is installed on the driver 1610 as required, so that a computer program read from the removable medium is installed into the storage part 1608 as required.

Particularly, according to an embodiment of this application, the processes described in the following by referring to the flowcharts may be implemented as computer software programs. For example, an embodiment of this application includes a computer program product. The computer program product includes a computer program stored in a computer-readable medium. The computer program includes a computer program used for performing a method shown in the flowchart. In such an embodiment, the computer program may be downloaded and installed from the network through the communication part 1609, and/or installed from the removable medium 1611. When the computer program is executed by the CPU 1601, the various functions defined in the system of this application are executed.

The computer-readable medium shown in the embodiments of this application may be a computer-readable signal medium or a computer-readable storage medium or any combination of the two. The computer-readable storage medium may be, for example, but is not limited to, an electric, magnetic, optical, electromagnetic, infrared, or semi-conductive system, apparatus, or component, or any combination of the above. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In this application, the computer-readable storage medium may be any tangible medium containing or storing a program, and the program may be used by or used in combination with an instruction execution system, an apparatus, or a device. In this application, the computer-readable signal medium may include a data signal transmitted in a baseband or as part of a carrier, and stores a computer-readable computer program. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in conjunction with an instruction execution system, an apparatus, or a device. The computer program included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions, and operations that may be implemented by a system, a method, and a computer program product according to various embodiments of this application. Each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of this application may be implemented in a software manner, or may be implemented in a hardware manner, and the unit described can also be set in a processor. Names of the units do not constitute a limitation on the units in a specific case.

According to another aspect, this application further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the implementations of this application, the features and functions of two or more modules or units described above may be specifically implemented in one module or unit. On the contrary, the features and functions of one module or unit described above may be further divided to be embodied by a plurality of modules or units.

According to the foregoing descriptions of the implementations, a person skilled in the art may readily understand that the exemplary implementations described herein may be implemented by using software, or may be implemented by combining software and necessary hardware. Therefore, the technical solutions of the embodiments of this application may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of this application.

After considering the specification and practicing the implementations of the present disclosure, a person skilled in the art may easily conceive of other implementations of this application. This application is intended to cover any variations, uses, or adaptive changes of this application. These variations, uses, or adaptive changes follow the general principles of this application and include common general knowledge or common technical means in the art, which are not disclosed in this application.

It is to be understood that this application is not limited to the precise structures described above and shown in the accompanying drawings, and various modifications and changes can be made without departing from the scope of this application. The scope of this application is subject only to the appended claims.

What is claimed is:

1. A time synchronization method, comprising: receiving a triggering delivery service request message transmitted by an application function (AF) entity, the triggering delivery service request message comprising an identifier of a target user equipment and a time sensitive network (TSN) trigger container, the TSN trigger container used to indicate a TSN time synchronization trigger condition; converting the identifier of the target user equipment from an external identifier to a network identifier, wherein: in response to the identifier of the target user equipment comprising an external identifier of a single user equipment, the external identifier of the single user equipment is converted into a network identifier of the single user equipment; and in response to the identifier of the target user equipment comprising an external group identifier corresponding to a plurality of user equipments, the external group identifier is converted into a network identifier list of the plurality of user equipments; and transmitting a submission triggering message to a short message service-service center (SMS-SC), the submission triggering message used to request the SMS-SC to transmit a short message comprising the TSN trigger container to the target user equipment, to enable the target user equipment to perform a TSN time synchronization operation based on the TSN trigger container.

2. The time synchronization method according to claim 1, wherein the identifier of the target user equipment comprises an external group identifier corresponding to a plurality of user equipments, and the transmitting a submission triggering message to an SMS-SC comprises: transmitting a submission triggering message to the SMS-SC separately for each user equipment in the network identifier list.

3. The time synchronization method according to claim 1, wherein in response to determining, according to a configuration of a carrier network, that a network exposure function (NEF) entity controls a moment at which the target user equipment performs the TSN time synchronization operation, the transmitting a submission triggering message to an SMS-SC comprises:
    in response to user equipment trigger time information comprised in the triggering delivery service request message instructing to perform a user equipment trigger operation immediately or the triggering delivery service request message does not comprise user equipment trigger time information, transmitting the submission triggering message to the SMS-SC immediately;
    in response to user equipment trigger time information comprised in the triggering delivery service request message instructing to perform a user equipment trigger operation after a predetermined time, transmitting the submission triggering message to the SMS-SC after the predetermined time of receiving the triggering delivery service request message;
    in response to user equipment trigger time information comprised in the triggering delivery service request message instructing to perform a user equipment trigger operation at a specified time point, transmitting the submission triggering message to the SMS-SC in response to a current time reaching the specified time point; and
    in response to user equipment trigger time information comprised in the triggering delivery service request message instructing to perform a user equipment trigger operation at a specified time point, but a current time exceeds the specified time point, transmitting the submission triggering message to the SMS-SC immediately.

4. The time synchronization method according to claim 1, wherein the transmitting a submission triggering message to an SMS-SC comprises:
    in response to determining, according to a configuration of a carrier network, that the SMS-SC controls a moment at which the target user equipment performs the TSN time synchronization operation, transmitting a submission triggering message comprising short message delivery time information to the SMS-SC, the short message delivery time information being from user equipment trigger time information in the triggering delivery service request message; or transmitting a submission triggering message comprising TSN activation time information to the SMS-SC, the TSN activation time information being set in the TSN trigger container.

5. The time synchronization method according to claim 1, wherein
in response to the TSN trigger container comprises TSN activation time information, using the TSN activation time information to instruct the target user equipment to perform the TSN time synchronization operation immediately after receiving the short message, or instructing the target user equipment to perform the TSN time synchronization operation after a predetermined time of receiving the short message, or instructing the target user equipment to perform the TSN time synchronization operation at a specified time point; and
in response to the TSN trigger container not comprising the TSN activation time information, using the TSN trigger container to instruct the target user equipment to perform the TSN time synchronization operation immediately after receiving the short message.

6. The time synchronization method according to claim 1, wherein
in response to the submission triggering message comprising short message delivery time information, using the short message delivery time information to instruct the SMS-SC to transmit the short message immediately after receiving the submission triggering message, or instructing the SMS-SC to transmit the short message after a predetermined time of receiving the submission triggering message, or instructing the SMS-SC to transmit the short message at a specified time point, the short message delivery time information being from user equipment trigger time information in the triggering delivery service request message; and
in response to the submission triggering message not comprising the short message delivery time information, using the submission triggering message to instruct the SMS-SC to transmit the short message immediately after receiving the submission triggering message.

7. The time synchronization method according to claim 1, wherein the TSN trigger container comprises: a TSN time domain identifier, first field information indicating uplink TSN synchronization or downlink TSN synchronization, second field information indicating an activation operation or a deactivation operation, network slice information, and a data network name.

8. A time synchronization method, comprising:
receiving a short message transmitted by a short message service-service center (SMS-SC), the short message comprising a time sensitive network (TSN) trigger container, the TSN trigger container used to indicate a TSN time synchronization trigger condition, wherein the TSN trigger container comprises second field information used to indicate an activation operation or a deactivation operation; and
performing a TSN time synchronization operation based on information comprised in the TSN trigger container by:
in response to the second field information indicating an activation operation, and TSN activation time information comprised in the TSN trigger container instructing a user equipment to perform the TSN time synchronization operation immediately after receiving the short message, establishing a protocol data unit (PDU) session to perform the TSN time synchronization operation immediately;
in response to the second field information indicating an activation operation, and TSN activation time information comprised in the TSN trigger container instructing a user equipment to perform the TSN time synchronization operation after a predetermined time of receiving the short message, establishing a PDU session to perform the TSN time synchronization operation after the predetermined time of receiving the short message;
in response to the second field information indicating an activation operation, and TSN activation time information comprised in the TSN trigger container instructing a user equipment to perform the TSN time synchronization operation at a specified time point, establishing a PDU session to perform the TSN time synchronization operation in response to a current time reaching the specified time point;
in response to the second field information indicating an activation operation, and TSN activation time information comprised in the TSN trigger container instructing a user equipment to perform the TSN time synchronization operation at a specified time point, but a current time exceeds the specified time point, establishing a PDU session to perform the TSN time synchronization operation immediately; and
in response to the TSN trigger container not comprising TSN activation time information, and the second field information indicating an activation operation, establishing a PDU session to perform the TSN time synchronization operation immediately.

9. The time synchronization method according to claim 8, wherein the establishing a PDU session to perform the TSN time synchronization operation after the predetermined time of receiving the short message comprises:
detecting whether the user equipment is in an idle state after the predetermined time of receiving the short message;
in response to detecting that the user equipment is in an idle state, performing a service request process, and after a signaling connection is established with an access and mobility management function (AMF) entity, establishing a PDU session to perform the TSN time synchronization operation; and
in response to detecting that the user equipment is in a connected state, directly establishing a PDU session to perform the TSN time synchronization operation.

10. The time synchronization method according to claim 8, wherein the establishing a PDU session to perform the TSN time synchronization operation in response to a current time reaching the specified time point comprises:
detecting whether the user equipment is in an idle state in response to the current time reaching the specified time point;
in response to detecting that the user equipment is in an idle state, performing a service request process, and after a signaling connection is established with an AMF entity, establishing a PDU session to perform the TSN time synchronization operation; and
in response to detecting that the user equipment is in a connected state, directly establishing a PDU session to perform the TSN time synchronization operation.

11. The time synchronization method according to claim 8, wherein the PDU session is established, a transmitted PDU session establishment request comprises a set of parameters, the set of parameters and values of the set of parameters are from the TSN trigger container comprised in the short message, and the set of parameters comprises:
a TSN time domain identifier, first field information used to indicate uplink TSN synchronization or downlink TSN synchronization, second field information used to indicate an activation operation, network slice information, and a data network name.

12. The time synchronization method according to claim 8, wherein
the performing a TSN time synchronization operation based on information comprised in the TSN trigger container further comprises:
in response to the second field information indicating a deactivation operation, and TSN activation time information comprised in the TSN trigger container instructing a user equipment to perform the TSN time synchronization operation immediately after receiving the short message, releasing a PDU session or initiating a PDU session modification process immediately;
in response to the second field information indicating a deactivation operation, and TSN activation time information comprised in the TSN trigger container instructing a user equipment to perform the TSN time synchronization operation after a predetermined time of receiving the short message, releasing a PDU session or initiating a PDU session modification process after the predetermined time of receiving the short message;
in response to the second field information indicating a deactivation operation, and TSN activation time information comprised in the TSN trigger container instructing a user equipment to perform the TSN time synchronization operation at a specified time point, releasing a PDU session or initiating a PDU session modification process in response to a current time reaching the specified time point;
in response to the second field information indicating an activation operation, and TSN activation time information comprised in the TSN trigger container instructing a user equipment to perform the TSN time synchronization operation at a specified time point, but a current time exceeds the specified time point, releasing a PDU session or initiating a PDU session modification process immediately; and
in response to the TSN trigger container not comprising TSN activation time information, and the second field information indicating a deactivation operation, releasing a PDU session or initiating a PDU session modification process immediately.

13. The time synchronization method according to claim 12, wherein the initiating a PDU session modification process comprises:
generating a PDU session modification request, the PDU session modification request comprising an identifier of a target TSN time domain that needs to be deactivated; and
transmitting the PDU session modification request to a session management function (SMF) entity, to enable the SMF entity to instruct a user plane function (UPF) entity to stop forwarding TSN time synchronization data of the target TSN time domain to the user equipment transmitting the PDU session modification request.

14. The time synchronization method according to claim 12, wherein a PDU session established by the user equipment supports time synchronization operations of a plurality of TSN time domains;
the PDU session modification process is initiated in response to a target TSN time domain that needs to be deactivated, network slice information and a data network name comprised in the TSN trigger container that respectively match a TSN time domain, network slice information and a data network name of the PDU session established by the user equipment, and the target TSN time domain that needs to be deactivated as indicated by the TSN trigger container not being the last TSN time domain in the PDU session; and
the PDU session is released in response to the target TSN time domain that needs to be deactivated, the network slice information and the data network name comprised in the TSN trigger container that respectively match the TSN time domain, the network slice information and the data network name of the PDU session established by the user equipment separately, and the target TSN time domain that needs to be deactivated as indicated by the TSN trigger container being the last TSN time domain in the PDU session.

15. The time synchronization method according to claim 8, wherein the TSN trigger container comprises: a TSN time domain identifier, first field information used to indicate uplink TSN synchronization or downlink TSN synchronization, second field information used to indicate an activation operation or a deactivation operation, network slice information, and a data network name.

16. A time synchronization method, comprising:
receiving a submission triggering message, the submission triggering message used to request transmission of a short message comprising a time sensitive network (TSN) trigger container to a target user equipment, the TSN trigger container used to indicate a TSN time synchronization trigger condition; and
generating the short message, and transmitting the short message to the target user equipment, to enable the target user equipment to perform a TSN time synchronization operation based on the TSN trigger container,
wherein the transmitting the short message to the target user equipment comprises:
in response to short message delivery time information comprised in the submission triggering message instructs to transmit the short message immediately or the submission triggering message does not comprise short message delivery time information, transmitting the short message to the target user equipment immediately;
in response to short message delivery time information comprised in the submission triggering message instructs to transmit the short message after a predetermined time, transmitting the short message to the target user equipment after the predetermined time of receiving the submission triggering message;
in response to short message delivery time information comprised in the submission triggering message instructs to transmit the short message at a specified time point, transmitting the short message to the target user equipment in response to a current time reaching the specified time point; and
in response to short message delivery time information comprised in the submission triggering message instructs to transmit the short message at a specified time point, but a current time exceeds the specified time point, transmitting the short message to the target user equipment immediately.

17. The time synchronization method according to claim 16, wherein receiving the submission triggering message comprises receiving a submission triggering message separately for each user equipment in a network identifier list.

* * * * *